US012566440B2

(12) United States Patent
Liu et al.

(10) Patent No.: US 12,566,440 B2
(45) Date of Patent: Mar. 3, 2026

(54) SYSTEMS AND METHODS FOR GENERATING BASIS PATHS FOR AUTONOMOUS VEHICLE MOTION CONTROL

(71) Applicant: Aurora Operations, Inc., Pittsburgh, PA (US)

(72) Inventors: Chenggang Liu, Pittsburgh, PA (US); David McAllister Bradley, Pittsburgh, PA (US); Daoyuan Jia, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/647,223

(22) Filed: Apr. 26, 2024

(65) Prior Publication Data

US 2024/0272637 A1 Aug. 15, 2024

Related U.S. Application Data

(63) Continuation of application No. 18/158,251, filed on Jan. 23, 2023, now Pat. No. 12,001,215, which is a (Continued)

(51) Int. Cl.
*G05D 1/644* (2024.01)
*B60W 30/18* (2012.01)
(Continued)

(52) U.S. Cl.
CPC ......... *G05D 1/0217* (2013.01); *B60W 60/001* (2020.02); *G05D 1/644* (2024.01);
(Continued)

(58) Field of Classification Search
CPC ... G05D 1/0217; G05D 1/644; B60W 60/001; B60W 30/18163; B60W 2520/06;
(Continued)

(56) References Cited

U.S. PATENT DOCUMENTS 9,428,187 B2 * 8/2016 Lee ....................... B60W 30/12
11,400,934 B2 8/2022 Jalali et al.
(Continued)

FOREIGN PATENT DOCUMENTS

CN 110389584 A 10/2019
CN 111615476 A 9/2020
EP 3683546 A2 * 7/2020 ........ B60W 60/0011

OTHER PUBLICATIONS

Takahashi Hideki , Jan. 17, 2017, English Machine Translation_ EP3683546A2 provided by Patent Translate by EPO and Google (Year: 2019).*

(Continued)

*Primary Examiner* — Ashley L Redhead, Jr.
(74) *Attorney, Agent, or Firm* — Dority & Manning, P.A.

(57) ABSTRACT

Systems and methods for basis path generation are provided. In particular, a computing system can obtain a target nominal path. The computing system can determine a current pose for an autonomous vehicle. The computing system can determine, based at least in part on the current pose of the autonomous vehicle and the target nominal path, a lane change region. The computing system can determine one or more merge points on the target nominal path. The computing system can, for each respective merge point in the one or more merge points, generate a candidate basis path from the current pose of the autonomous vehicle to the respective merge point. The computing system can generate a suitability classification for each candidate basis path. The computing system can select one or more candidate basis paths based on the suitability classification for each respective candidate basis path in the plurality of candidate basis paths.

19 Claims, 11 Drawing Sheets

Related U.S. Application Data continuation of application No. 17/067,141, filed on Oct. 9, 2020, now Pat. No. 11,561,548.

(60) Provisional application No. 63/077,285, filed on Sep. 11, 2020.

(51) Int. Cl.
  *B60W 60/00*     (2020.01)
  *G05D 1/00*     (2006.01)

(52) U.S. Cl.
  CPC ... *B60W 30/18163* (2013.01); *B60W 2520/06* (2013.01); *B60W 2520/105* (2013.01); *B60W 2520/125* (2013.01); *B60W 2552/10* (2020.02); *B60W 2555/60* (2020.02)

(58) Field of Classification Search
  CPC ..... B60W 2520/105; B60W 2520/125; B60W 2552/10; B60W 2555/60; B60W 2520/10; B60W 2552/53; B60W 60/0011; G01C 21/26
  See application file for complete search history.

(56)           References Cited

U.S. PATENT DOCUMENTS

| | | | | |
|---|---|---|---|---|
| 11,733,960 B1 * | 8/2023 | Karol | ...................... | G08G 1/166 |
| | | | | 340/463 |
| 12,122,419 B2 * | 10/2024 | Jing | ...................... | G05D 1/0022 |
| 2005/0251323 A1 | 11/2005 | Heinrichs-Bartscher | | |
| 2014/0195093 A1 | 7/2014 | Litkouhi et al. | | |
| 2015/0353085 A1 * | 12/2015 | Lee | ........................ | B60W 30/10 |
| | | | | 701/533 |
| 2017/0151982 A1 | 6/2017 | Fujii et al. | | |
| 2017/0334452 A1 * | 11/2017 | Abe | ................... | G01C 21/3658 |
| 2018/0284768 A1 * | 10/2018 | Wilkinson | ............. | G05D 1/228 |
| 2019/0016338 A1 * | 1/2019 | Ishioka | ........... | B60W 30/18163 |
| 2019/0315357 A1 * | 10/2019 | Zhang | .................. | G05D 1/0238 |
| 2020/0150672 A1 | 5/2020 | Naghshvar et al. | | |
| 2020/0218907 A1 * | 7/2020 | Baik | ....................... | G06F 17/16 |
| 2020/0226393 A1 * | 7/2020 | Han | ...................... | G06F 18/231 |
| 2020/0307594 A1 | 10/2020 | Kato et al. | | |
| 2021/0107566 A1 * | 4/2021 | Seegmiller | .............. | H04W 4/02 |
| 2021/0163011 A1 | 6/2021 | Maru et al. | | |
| 2021/0370978 A1 | 12/2021 | Molinar | | |
| 2022/0027193 A1 * | 1/2022 | Guney | .................. | G06F 9/3851 |
| 2022/0048513 A1 * | 2/2022 | Xu | .................. | B60W 30/18163 |

OTHER PUBLICATIONS

International Search Report and Written Opinion for Application No. PCT/US2021/049855, mailed Jan. 10, 2022, 20 pages.
Chen Chen et al., "An Intelligent Platooning Algorithm for Sustainable Transportation Systems in Smart Cities", IEEE Sensors Journal, vol. 21, No. 14, Aug. 25, 2020, figure 7, pp. 15437-15447.

\* cited by examiner

FUNCTION GRAPH
225

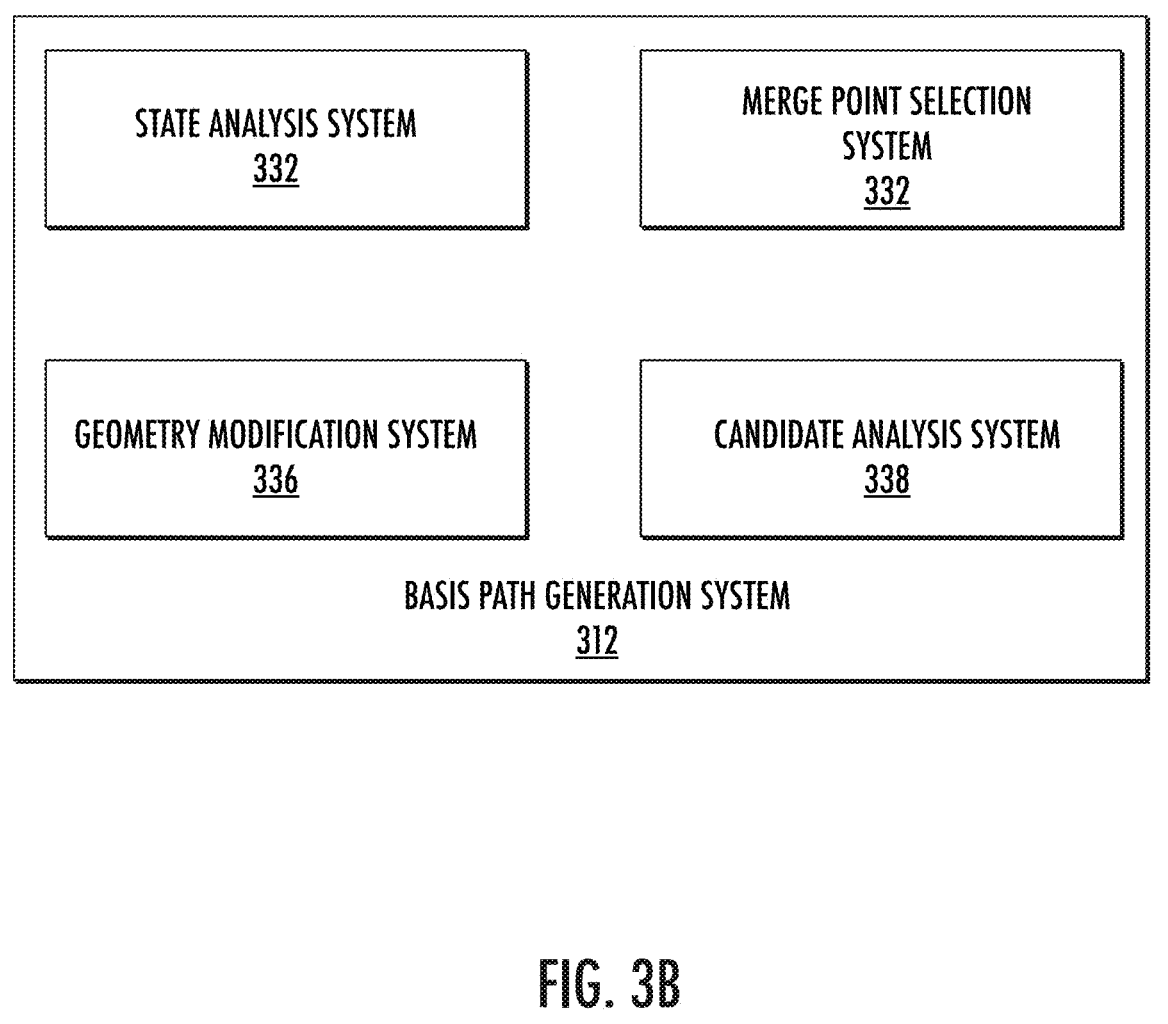

STATE ANALYSIS SYSTEM
332

MERGE POINT SELECTION
SYSTEM
332

GEOMETRY MODIFICATION SYSTEM
336

CANDIDATE ANALYSIS SYSTEM
338

BASIS PATH GENERATION SYSTEM
312

FIG. 3B

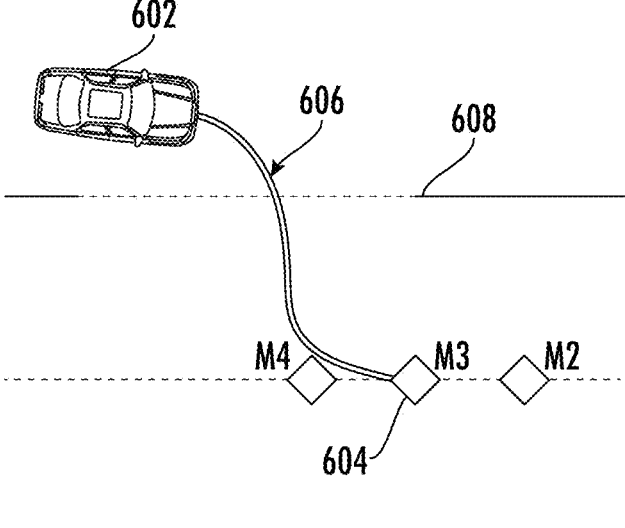
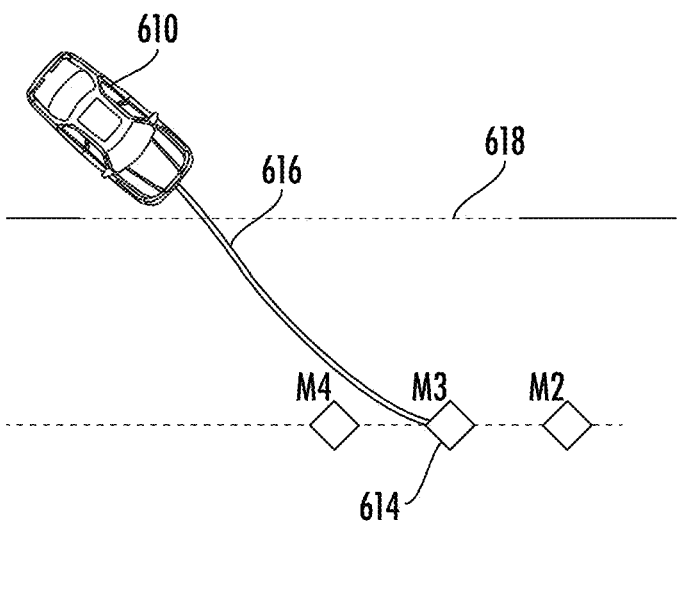
FIG. 6

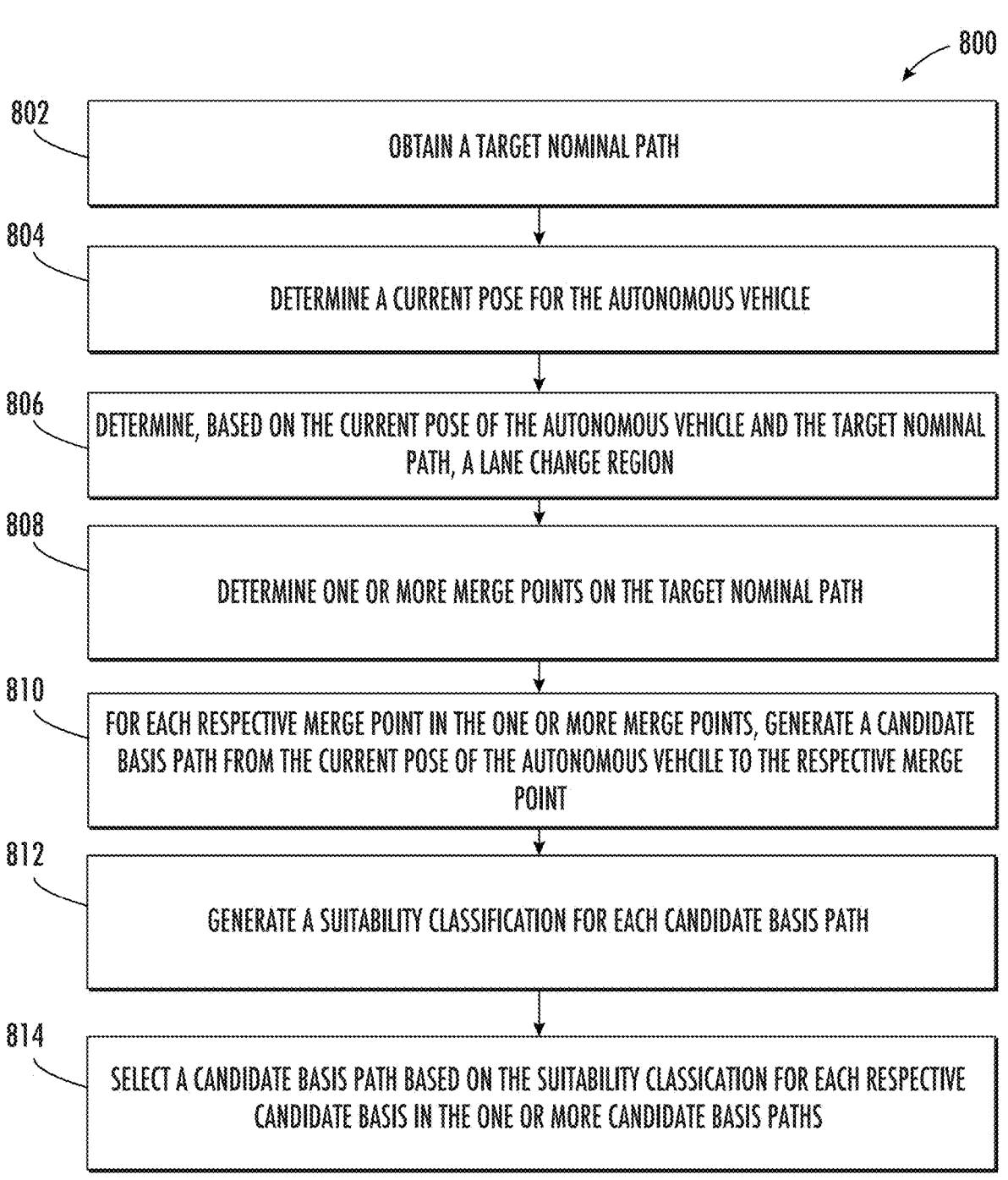

800

802  OBTAIN A TARGET NOMINAL PATH

804  DETERMINE A CURRENT POSE FOR THE AUTONOMOUS VEHICLE

806  DETERMINE, BASED ON THE CURRENT POSE OF THE AUTONOMOUS VEHICLE AND THE TARGET NOMINAL PATH, A LANE CHANGE REGION

808  DETERMINE ONE OR MORE MERGE POINTS ON THE TARGET NOMINAL PATH

810  FOR EACH RESPECTIVE MERGE POINT IN THE ONE OR MORE MERGE POINTS, GENERATE A CANDIDATE BASIS PATH FROM THE CURRENT POSE OF THE AUTONOMOUS VEHCILE TO THE RESPECTIVE MERGE POINT

812  GENERATE A SUITABILITY CLASSIFICATION FOR EACH CANDIDATE BASIS PATH

814  SELECT A CANDIDATE BASIS PATH BASED ON THE SUITABILITY CLASSICATION FOR EACH RESPECTIVE CANDIDATE BASIS IN THE ONE OR MORE CANDIDATE BASIS PATHS

COMPUTING SYSTEM
COMPUTING DEVICES
PROCESSORS    MEMORY    1020
INSTRUCTIONS    1025
1040    COMM. INTERFACE    DATA    1030

SYSTEMS AND METHODS FOR GENERATING BASIS PATHS FOR AUTONOMOUS VEHICLE MOTION CONTROL

RELATED APPLICATIONS

The present application is a continuation of U.S. Non-provisional patent application Ser. No. 18/158,251, filed Jan. 23, 2023, which is a continuation of U.S. Non-provisional patent application Ser. No. 17/067,141, filed Oct. 9, 2020 (issued as U.S. Pat. No. 11,561,548 on Jan. 24, 2023), which claims priority to and the benefit of U.S. Provisional Patent Application No. 63/077,285, filed Sep. 11, 2020, which is hereby incorporated by reference in its entirety.

FIELD

The present disclosure relates generally to autonomous vehicles. More particularly, the present disclosure relates to path planning for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system comprising one or more processors, a target nominal path. The method can include determining, by the computing system, a current pose for the autonomous vehicle. The method can include determining, by the computing system and based at least in part on the current pose of the autonomous vehicle and the target nominal path, a lane change region. The method can include determining, by the computing system, one or more merge points on the target nominal path. The method can include, for each respective merge point in the one or more merge points, generating, by the computing system, a candidate basis path from the current pose of the autonomous vehicle to the respective merge point, such that a plurality of candidate basis paths are generated. The method can include generating, by the computing system, a suitability classification for each candidate basis path. The method can include selecting, by the computing system, one or more candidate basis paths based on the suitability classification for each respective candidate basis path in the plurality of candidate basis paths.

Another example aspect of the present disclosure is directed to a computing system. The computing system can include one or more processors and one or more non-transitory computer-readable memories, wherein the one or more non-transitory computer-readable memories store instructions that, when executed by the processor, cause the computing system to perform operations. The computing system can obtain a target nominal path. The computing system can determine a current pose for the autonomous vehicle. The computing system can determine based on the current pose of the autonomous vehicle and the target nominal path, a lane change region. The computing system can determine one or more merge points on the target nominal path. The computing system can, for each respective merge point in the one or more merge points, generate a candidate basis path from the current pose of the autonomous vehicle to the respective merge point such that a plurality of candidate basis paths are generated. The computing system can generate a suitability classification for each candidate basis path. The computing system can select a candidate basis path based on the suitability classification for each respective candidate basis path in the plurality of candidate basis paths.

Yet another example aspect of the present disclosure is directed to an autonomous vehicle. The autonomous vehicle can obtain a target nominal path. The autonomous vehicle can determine a current pose for the autonomous vehicle. The autonomous vehicle can determine based on the current pose of the autonomous vehicle and the target nominal path, a lane change region. The autonomous vehicle can determine one or more merge points on the target nominal path. The autonomous vehicle can, for each respective merge point in the one or more merge points, generate a candidate basis path from the current pose of the autonomous vehicle to the respective merge point such that a plurality of candidate basis paths are generated. The autonomous vehicle can generate a suitability classification for each candidate basis path. The autonomous vehicle can select a candidate basis path based on the suitability classification for each respective candidate basis path in the plurality of candidate basis paths.

Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which:

FIG. 3B depicts a block diagram of an example basis path generation system according to example embodiments of the present disclosure.

FIG. 6 depicts an example diagram illustrating the generation of merge points within a lane change region (608 and 618) according to example embodiments of the present disclosure.

FIG. 8 depicts a flow chart diagram of an example method according to example embodiments of the present disclosure.

DETAILED DESCRIPTION

Figure 1:
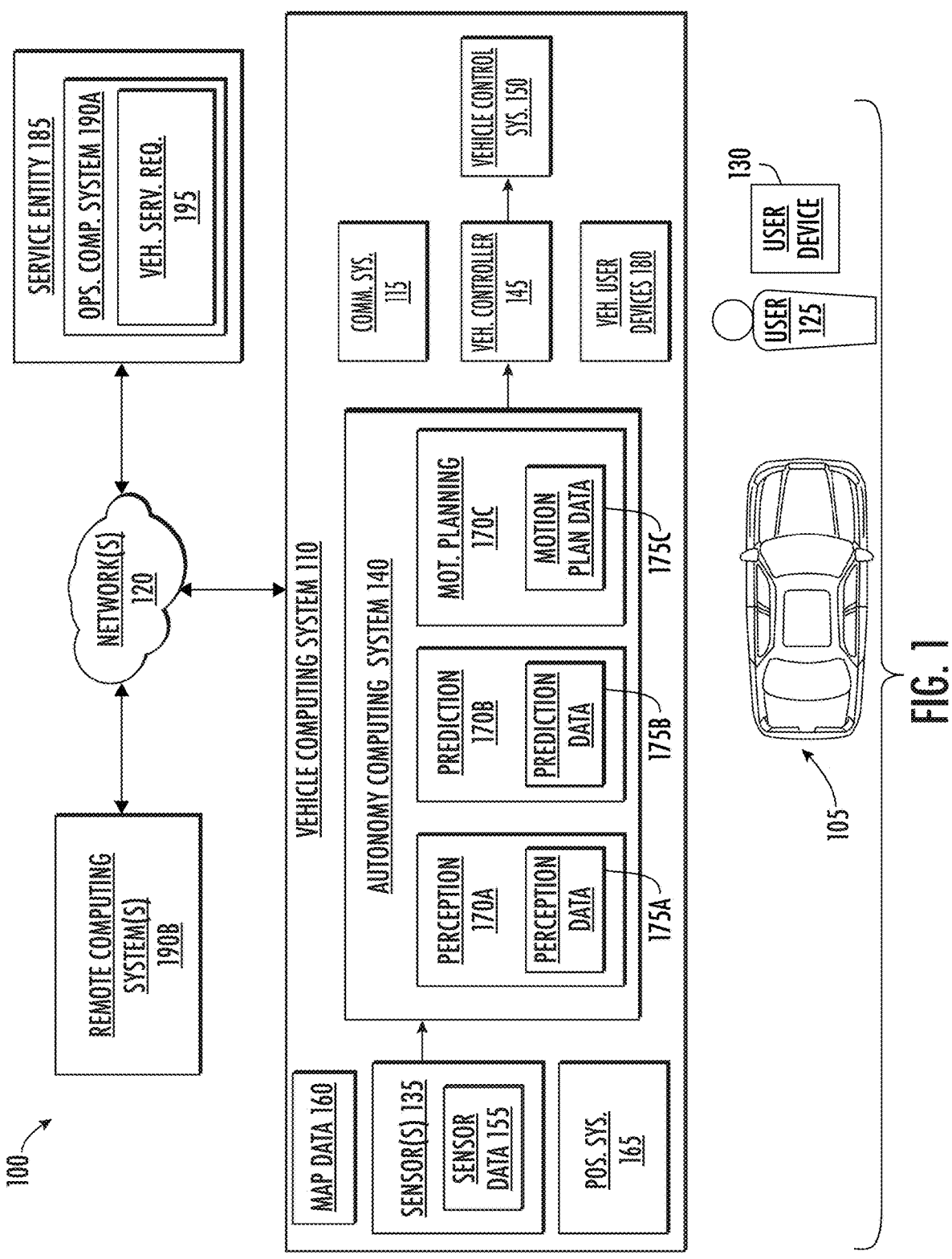
FIG. 1 depicts a block diagram of an example autonomous vehicle according to example embodiments of the present disclosure.

Generally, the present disclosure is directed to generating a basis path for use by an autonomous vehicle as it generates motion plans for navigating through its environment. A basis path can be generated during an initial part of the path planning process. A basis path can be an initial path that can be used to generate and evaluate candidate trajectories. To generate a basis path, a vehicle computing system associated with the autonomous vehicle can access a nominal path (e.g., a predetermined path through an area such as the centerline of a lane) for a location associated with the autonomous vehicle. The vehicle computing system can identify a current position and pose of the autonomous vehicle. Based on the current position and pose of the autonomous vehicle, the vehicle computing system can generate a basis path from the current position to a point along the nominal path. The basis path can then represent a particular route from the autonomous vehicle's current position to a position along a predetermined nominal path.

In some examples, the vehicle computing system can generate a basis path to change from a first lane to a second lane. To do so, the vehicle computing system can access a target nominal path associated with the target lane. In some examples, the vehicle computing system can identify a plurality of potential target nominal paths. For example, if an autonomous vehicle determines that it needs to change lanes to avoid an obstacle, the autonomous vehicle can evaluate multiple potential target lanes, each with an associated nominal path. The vehicle computing system can access information describing the current heading, speed, and position of the autonomous vehicle. The vehicle computing system can identify at least one lane change region along the current lane boundary associated with the autonomous vehicle (e.g., the lane boundary associated with the lane in which the autonomous vehicle is currently located).

The vehicle computing system can identify one or more potential merge points along the target nominal path (or multiple target nominal paths) based at least in part on the lane change region. A merge point can represent a particular location along a target nominal path at which the autonomous vehicle can join the target nominal path. The vehicle computing system can generate a plurality of candidate basis paths, each candidate basis path representing a potential path from the current position of the autonomous vehicle to one of the identified merge points. Each candidate path can be evaluated to determine whether it meets one or more drivability constraints. Drivability constraints can include the maximum allowable acceleration and turning rate, among other possible criteria. The vehicle computing system can select a candidate basis path from the plurality of candidate basis paths.

In an example of the disclosed systems and methods, an autonomous vehicle can use a vehicle computing system to transition from a first lane to a second lane. As part of this process, the vehicle computing system can determine that the autonomous vehicle will move from the autonomous vehicle's current lane to another lane. This determination can be made based on an instruction from a remote services system and/or based on the analysis of a path planning module/system, associated with the vehicle computing system. The vehicle computing system can access a nominal path associated with the target lane from a map database. The vehicle computing system can identify a lane change region based on the current position, velocity, and pose of the autonomous vehicle. The lane change region can be an area in which the vehicle computing system plans to change from the current lane to the target lane. The lane change region's distance from the vehicle and total size can be determined based on a plurality of factors including, but not limited to, the current speed of the autonomous vehicle, the density of other objects in the travel way (e.g., a dense road will result in a larger lane change region to allow more flexibility to navigate around other actors/objects), factors associated with the environment itself (e.g., if the current lane is ending, the lane change region is placed before the end of the current lane), etc.

The vehicle computing system can alter its internally stored representation of the lane boundaries between the current lane and the target lane to remove the lane boundaries within the lane change region. In this way, the vehicle computing system can plan a path that crosses the actual lane boundaries while in the lane change region. The vehicle computing system can determine a plurality of merge points along the target nominal path. The vehicle computing system can plan a plurality of candidate basis paths, each candidate basis path representing a route from the current position of the autonomous vehicle to one of the determined merge points.

The vehicle computing system can evaluate each candidate basis path by generating a cost value for each candidate basis path. One factor that the vehicle computing system can consider when generating a cost associated with each candidate basis path is the drivability of the candidate basis path. Thus, the vehicle computing system can analyze each candidate basis path to determine whether maximum acceleration, velocity, jerk, and/or turning rate values for the candidate basis paths. These values can be compared to predetermined threshold values for each of these values and the vehicle computing system can increase the costs of candidate basis paths that exceed the threshold values. The vehicle computing system can select a particular candidate basis path based on the costs associated with the plurality of candidate basis paths. The vehicle computing system can then use this selected basis path to generate a motion plan for the autonomous vehicle.

In some examples, the vehicle computing system can include a geometric planner. The geometric planner can access map geometry for the area around the autonomous vehicle, including, but not limited to a nominal path and lane boundaries. The geometric planner may modify the nominal path to transition between the current location and pose of the autonomous vehicle and the target path or destination of the autonomous vehicle.

More specifically, the above-described vehicle computing system can be included in an autonomous vehicle (e.g., ground-based vehicle, aerial vehicle, etc.). For example, an autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, and generate trajectories for the vehicle to follow based on the route/perceived objects/predicted object motion. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

To accomplish these operations, the autonomy computing system can include, for example, a perception system, a prediction system, and a motion planning system. Many of the functions performed by the perception system, prediction system, and motion planning system can be performed, in whole or in part, by one or more machine-learning models. Moreover, one or more of the perception system, prediction system, and/or motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to the structured machine-learned model(s). In addition or alternatively, the autonomous vehicle can access map data (e.g., high definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The computing system of an autonomous vehicle can include a plurality of devices (e.g., physically-connected devices, wirelessly-connected devices, virtual devices running on a physical machine, etc.) that implement a software graph architecture of the autonomous vehicle. For instance, the computing devices can implement the vehicle's autonomy software that helps allow the vehicle to autonomously operate within its environment. Each device can include a compute node configured to run one or more processes. A process can include a plurality of function nodes (e.g., software functions) connected by one or more directed edges that dictate the flow of data between the plurality of function nodes. A device can execute (e.g., via one or more processors, etc.) a respective plurality of function nodes to run a respective process. The plurality of processes can be collectively configured to perform one or more tasks or services of the computing system. To do so, the plurality of processes can be configured to communicate (e.g., send/receive messages) with each other over one or more communication channels (e.g., wired and/or wireless networks). By way of example, with respect to the vehicle's onboard computing system, its processes (and their respective function nodes) can be organized into a directed software graph architecture (e.g., including sub-graphs) that can be executed to communicate and perform the operations of the autonomous vehicle (e.g., for autonomously sensing the vehicle's environment, planning the vehicle's motion, etc.).

The vehicle computing system can utilize the sensor data to identify one or more objects in the local environment of the autonomous vehicle. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system can use the perception data to generate predictions for the movement of one or more objects as an object trajectory including one or more future coordinates/points. In some implementations, the perception and prediction functions of the vehicle computing system can be included within the same system.

The vehicle computing system can use the perception data, prediction data, map data, and/or other data to generate a motion plan for the vehicle. As noted above, one part of generating a motion plan can include generating a basis path to take the autonomous vehicle from the current position to a point along a target nominal path. The nominal path can represent an ideal path through an environment or travel way without consideration of any other actors in the environment (e.g., a path that travels down the center of a lane).

A basis path can describe a specific path for the autonomous vehicle to travel from a current location to a destination location. The basis path can be generated at a system that is remote from the autonomous vehicle and communicated to the autonomous vehicle and/or the basis path can be generated onboard the autonomous vehicle. The vehicle computing system can generate potential trajectories for the autonomous vehicle to follow as it traverses the basis path. Each potential trajectory can represent a variation of the basis path, such that it can be shifted laterally along the basis path and is assigned a specific speed profile. A plurality of potential trajectories can be generated such that a large number of lateral variations of the basis path are considered. Each potential trajectory can be executable by the autonomous vehicle (e.g., feasible for the vehicle control systems to implement). Each trajectory can be generated to comprise a specific amount of travel time (e.g., eight seconds, etc.).

The autonomous vehicle can select and implement a trajectory for the autonomous vehicle to navigate a specific segment of the route. For instance, the trajectory can be translated and provided to the vehicle control system(s) (e.g., via a vehicle interface/controller) that can generate specific control signals for the autonomous vehicle (e.g., alter steering, braking, velocity, and so on). The specific control signals can cause the autonomous vehicle to move in accordance with the selected trajectory.

The vehicle computing system of the autonomous vehicle can generate trajectories for the autonomous vehicle using a multi-step process. In some examples, some steps of the process can be performed out-of-cycle (e.g., not part of the real-time path generation cycle) and some steps of the process are performed during the real-time path generation cycle.

The out-of-cycle steps can include generating lane geometry for a plurality of potential lanes including, but not limited to lane boundaries for one or more lanes, determining a nominal path or centerline for each lane, and/or determining any other relevant factors for a particular area. In some examples, generating lane geometry may be accomplished or assisted by a geometry planner. In addition to generating lane geometry, the vehicle computing system can, as another out of cycle step, generate a list of static objects in the relevant geographic area, including, but not limited to, buildings, signs, mailboxes, other semi-permanent fixtures, etc. The lane geometry (including one or more nominal paths) can be accessed by the vehicle computing system while performing in-cycle path planning.

The vehicle computing system can, using the information provided by the out-of-cycle components of the vehicle computing system (e.g., lane geometry and static obstacle information) to generate a basis path for the autonomous vehicle.

The basis path can be generated by a basis path generation system. The basis path generation system can include a vehicle state analysis system, a merge point selection system, a geometry modification system, and a candidate analysis system.

The vehicle state analysis system can determine the current state of the autonomous vehicle. For example, the vehicle state analysis system can determine the current position (e.g., using an x, y coordinate), speed, heading, acceleration, and turning radius of the autonomous vehicle.

Once the state of the autonomous vehicle is determined, the merge point selection system can generate a plurality of candidate merge points at which the autonomous vehicle can join (or rejoin) the target nominal path. In some examples, the merge point selection system can determine a lane change region associated with joining the target nominal path (e.g., in situations in which the autonomous vehicle is changing lanes). In some examples, lane change regions are predetermined features of the lane geometry that represent an area in which lane changes are possible. In other examples, a lane change region can be determined dynamically based on the position and speed of the autonomous vehicle as well as the geometry of the lanes. Thus, if the autonomous vehicle is traveling faster, the merge point selection system can select a larger lane change region to give additional flexibility to the autonomous vehicle.

In some examples, the merge points can be existing features of the lane geometry. In this case, the merge point selection system can identify all merge points that are within a selected lane change region (or proximate thereto). Additionally, or alternatively, the merge points can be generated by the merge point selection system by identifying an initial point along the nominal path that is within the lane change region, and then identifying a plurality of candidate merge points by incrementally adding an interval distance along the nominal path until the end of the lane change region has been reached or a certain number of merge points have been generated.

The merge point selection system can filter the plurality of candidate merge points to remove any that are unsuitable immediately. To do so, the merge point selection system can order/prioritize the candidate merge points based on longitudinal distance along the nominal path. The merge point selection system can use a classifier to immediately eliminate some merge points. The classifier can take, as input, the speed of the autonomous vehicle (v), the curvature of the autonomous vehicle (c), the lateral distance to the target nominal lath (d), and/or the heading distance between the autonomous vehicle's current heading and the target heading at the candidate merge point (dth). The merge point selection system can fit a function regressor (F) such that $s=F(d, v, c, dth)$. If the candidate merge point's longitudinal distance along the nominal path is greater than s, the merge point can be retained. If not, the merge point selection system can eliminate the point from consideration as being too curvy (e.g., unlikely to result in a drivable basis path).

Once the plurality of candidate merge points has been filtered, the merge point selection system can generate a fit polynomial for each remaining candidate merge point. Generating fit polynomials is relatively cheap in a computational sense and as such, the cost of doing so can be relatively small. For each fit polynomial, the merge point selection system can determine whether the associated fit polynomial intersects with a lane boundary between the current lane and the target lane determined lane change region. If not, the merge point can be eliminated from consideration.

In some examples, each candidate merge point that intersects a lane boundary within a determined lane change region, can be selected for use in generating a basis path. In this way, the basis path generation system can generate a plurality of potential basis paths. In other examples, the merge point selection system can identify one or a small fixed number of candidate merge points as being the most likely candidates. Note that if the basis path generation does not include a lane change (e.g., the basis path corrects the autonomous vehicle back to the nominal path it was already following) then no merge points are generated. Instead, the merge point selection system can select a point along the nominal path (s) where $s=s0+round-up(F(d, v, c, dth), 1.0)$ wherein S0 is a point along the current nominal path where the autonomous vehicle is projected to be.

Once one or more merge points have been selected, the geometry modification system can determine whether the autonomous vehicle will be changing lanes. In some examples, the basis path generation system has been instructed explicitly to change lanes by another component of the vehicle computing system or a remote service system (e.g. to prepare for a turn or to avoid an obstacle). In other examples, the basis path generation system can determine that a lane change is necessary based on an analysis of the current position of the autonomous vehicle and the location of the target nominal path.

In the case where the autonomous vehicle is not changing lanes, the geometry modification system can alter stored lane boundary data (e.g., lane boundary offsets) to follow the new path back to the nominal path (e.g., the centerline of the lane). The geometry modification system can determine a series of points along the proposed basis path from the autonomous vehicle to a point along the nominal path. For each point, the geometry modification system can calculate new lane boundary offset value by extending a ray out perpendicularly from the point on the new path until it intersects an existing lane boundary. This distance can be set as the new lane boundary offset.

In the case in which the autonomous vehicle is changing lanes, the geometry modification system can alter stored information about lane boundaries to remove the lane boundaries within the lane change region. New lane offsets can be determined along the one or more basis paths by inserting new lane offset values with a fixed distance (e.g., 2.5 meters) that follow along each generated basis path.

Once one or more basis paths have been generated by the basis path generation system, a candidate analysis system can evaluate each candidate basis path to determine whether the candidate basis path meets one or more drivability criteria. Drivability criteria can include limits on speed, acceleration, turning radius, and so on. The candidate analysis can select one or more basis paths that meet the drivability criteria.

The one or more basis paths can be transmitted to a spatial path generator. The spatial path generator can generate a plurality of lateral offset profiles. Each lateral offset profile represents a distance to vary from the one or more basis paths. Thus, each basis path can have a plurality of associated candidate trajectories that vary laterally from the original basis path based on the values in the lateral offset profile. In addition, a plurality of speed profiles (which describe target speeds for the autonomous vehicle at each point along a basis path) can be generated. A plurality of candidate trajectories can be generated based on different combinations of a basis path, an offset profile, and/or a speed profile.

Once a plurality of candidate trajectories have been generated, each trajectory can be assigned a cost based on a plurality of cost determination functions. The vehicle computing system can select a candidate trajectory with the lowest total cost and implement it as vehicle control commands to control the autonomous vehicle.

The following provides an end-to-end example of the technology described herein. An autonomous vehicle can include a vehicle computing system. The vehicle computing system can obtain a target nominal path. In some examples, the target nominal path can be received from a remote server system associated with the autonomous vehicle. The vehicle computing system can determine a current pose for the autonomous vehicle. The current pose for an autonomous vehicle can include a current location and a current heading. The current location of the autonomous vehicle can be associated with a first lane and the target nominal path can be associated with a second lane. For example, if the autonomous vehicle is changing lanes to make a turn, the current lane and the target lane can be two different lanes. In some examples, a lane boundary separates the first lane and the second lane.

The vehicle computing system can determine, based on the current pose of the autonomous vehicle and the target nominal path, a lane change region. In some examples, the vehicle computing system can determine the lane change region by generating speed data associated with the autonomous vehicle and the target nominal path. The vehicle computing system can determine a longitudinal plan based on the speed data. In some examples, the lane change region can be determined based at least in part on the longitudinal plan.

The vehicle computing system can determine one or more merge points on the target nominal path. The vehicle computing system can identify an initial point along the target nominal path within the lane change region. The vehicle computing system can identify a first merge point at a predetermined distance along the target nominal path from the initial point.

The vehicle computing system can identify additional merge points by starting at the first merge point and identifying additional merge points along the target nominal path. In some examples, the distance interval between the one or more merge points remains constant. The vehicle computing system can filter the one or more merge points to remove any merge points that fall outside a predetermined threshold distance from the lane change region.

The vehicle computing system can, for each respective merge point in the one or more merge points, generate a candidate basis path from the current pose of the autonomous vehicle to the respective merge point. The vehicle computing system can generate a suitability classification for each candidate basis path.

The vehicle computing system can, for each candidate basis path, determine whether an acceleration rate associated with the candidate basis path exceeds a predetermined acceleration threshold. The suitability classification can be based, at least in part on whether the acceleration rate exceeds a predetermined acceleration threshold. For each candidate basis path, the vehicle computing system determines whether a maximum turning rate for the candidate basis path exceeds a predetermined turning threshold. The suitability classification can be based, at least in part on whether the maximum turning rate exceeds a predetermined turning threshold. In some examples, the turning rate of a candidate basis path can be measured by the determining a curvature of the candidate basis path. To do so, the vehicle computing system can generate a polynomial follows the candidate basis path for at least a portion of the line described by the polynomial. The polynomial (e.g., a fit polynomial) can be evaluated to determine its curvature and to determine a first, second, third, and other order derivatives. Thus, if the polynomial fit to the path, represents the change in the autonomous vehicles position, a first order derivative can represent its velocity, a second order derivative can represent its acceleration, and so on. A turning rate threshold can represent a maximum value for the curvature of a fit polynomial or any of its derivative. In some example, the predetermined turning threshold or curvature threshold can be based on the maximum rate that the steering mechanism of the autonomous vehicle (e.g., a steering wheel) can rotate.

The vehicle computing system can select one or more candidate basis paths based at least in part on the suitability classification for each respective candidate basis path in the one or more candidate basis paths. The vehicle computing system can generate a plurality of candidate trajectories for the autonomous vehicle based on the selected candidate basis paths.

The vehicle computing system can determine a cost associated with each candidate trajectory in the plurality of candidate trajectories for the autonomous vehicle. The vehicle computing system can select a candidate trajectory based on the costs associated with the plurality of candidate trajectories for the autonomous vehicle. The vehicle computing system can convert the selected candidate trajectory into one or more vehicle controls for implementation by the autonomous vehicle.

Various means can be configured to perform the methods and processes described herein. For example, a computing system can include path obtaining units(s), pose determination units(s), region identification units(s), merge point determination units(s), path generation units(s), classification units(s), selection units(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain a target nominal path. For example, a vehicle computing system can access target nominal path data from a map database stored in an accessible computing system. A path obtaining unit is one example of a means for obtaining a target nominal path.

The means can be configured to determine a current pose for the autonomous vehicle. For example, the vehicle computing system can determine the location, speed, and heading of the autonomous vehicle. A pose determination unit is one example of a means for determining a current pose for the autonomous vehicle.

The means can be configured to determine, based on the current pose of the autonomous vehicle and the target nominal path, a lane change region. For example, the vehicle computing system can determine a specific distance along a lane at which a lane change region begins and ends based on the characteristics of the lane and the speed and pose of the autonomous vehicle. A region identification unit is one example of a means for determining, based on the current pose of the autonomous vehicle and the target nominal path, a lane change region.

The means can be configured to determine one or more merge points on the target nominal path. For example, the vehicle computing system can identify a series of coordinates that make up the nominal path. The vehicle computing system can identify each coordinate from the nominal path that falls within the lane change region as potential merge points. The potential merge points can be filtered to remove any unsuitable merge points. A merge point determination unit is one example of a means for determining one or more merge points on the target nominal path.

The means can be configured to, for each respective merge point in the one or more merge points, generate a candidate basis path from the current pose of the autonomous vehicle to the respective merge point. For example, the vehicle computing system can plan a path from the autonomous vehicle to each candidate merge point. A path generation unit is one example of a means for, for each respective merge point in the one or more merge points, generating a candidate basis path from the current pose of the autonomous vehicle to the respective merge point.

The means can be configured to generate a suitability classification for each candidate basis path. For example, the vehicle computing system can evaluate a maximum acceleration rate, speed, and/or turning rate for the candidate basis path. A classification unit is one example of a means for generating a suitability classification for each candidate basis path.

The means can be configured to select a candidate basis path based on the suitability classification for each respective candidate basis path in the one or more candidate basis paths. For example, the vehicle computing system can choose the basis path that is the most suitable for reaching a point on the target nominal path. A selection unit is one example of a means for selecting a candidate basis path based on the suitability classification for each respective candidate basis path in the one or more candidate basis paths.

The systems and methods described herein provide a number of technical effects and benefits. More particularly, the systems and methods of the present disclosure provide improved techniques for performing the path planning functions associated with an autonomous vehicle. Specifically, a basis path generation system that generates basis paths for use in the path planning system as described above can allow the autonomous vehicle to more efficiently travel through an environment and safely react to events and/or obstacles. As a result, the path planning system can more efficiently plan paths and select appropriate trajectories. This results in a reduction in the number of processing cycles necessary, reducing the amount of data storage needed, and reducing the amount of energy used by the system. Reducing energy consumption also increases the useful battery life of any battery systems included in the autonomous vehicle.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WIFI access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects within the surrounding environment of the vehicle 105 based at least in part on the sensor data from the sensors 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 170B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 170B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can consider a route/route data when performing the motion planning function 170C.

The motion planning function 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning function 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectory. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back-passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of vehicle 105 can provide user input to adjust a destination location of vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., it's one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2A:
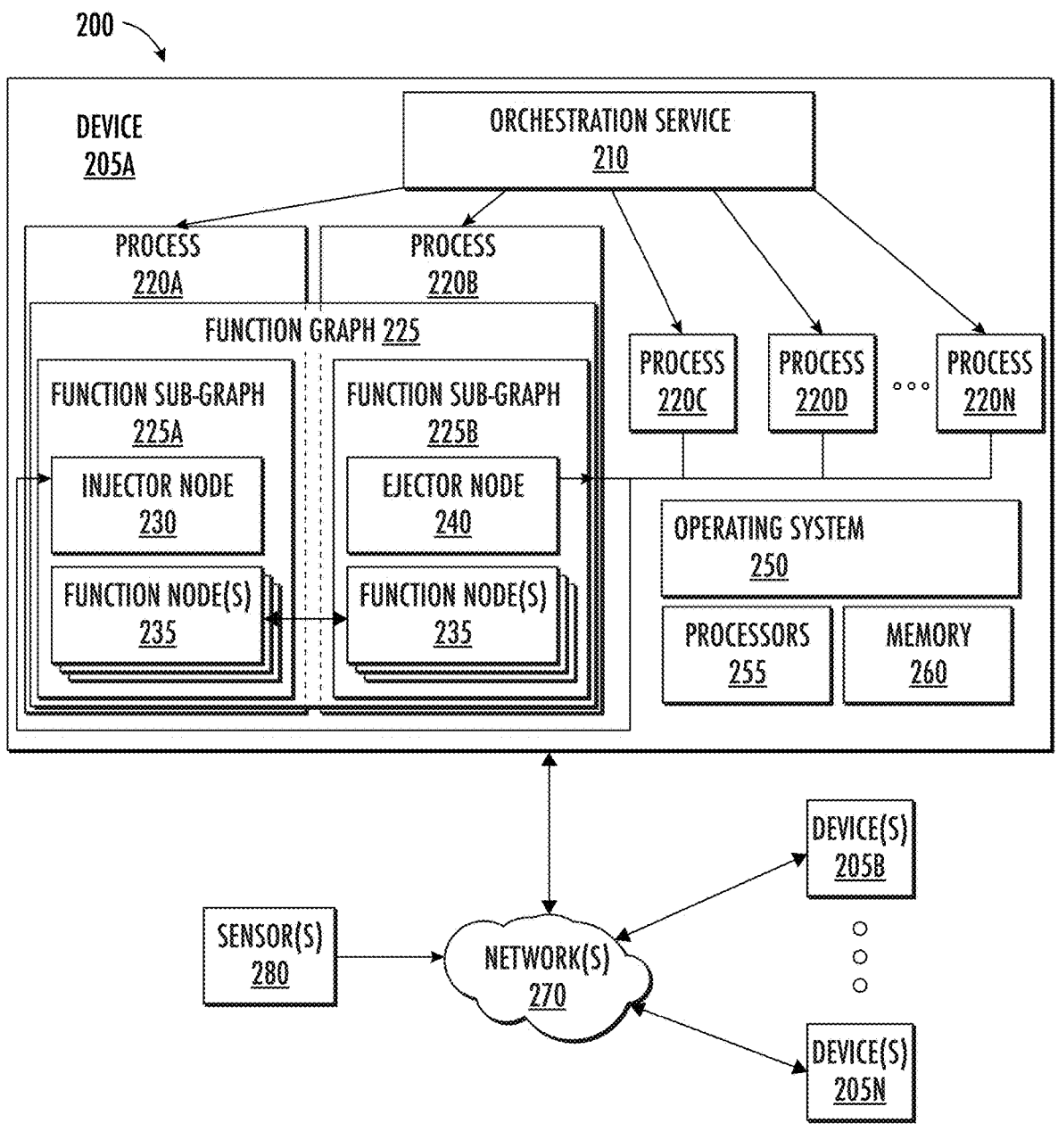
FIG. 2A depicts a diagram of an example system including a plurality of devices configured to execute one or more processes according to example implementations of the present disclosure.

FIG. 2A depicts a diagram of an example computing system 200 including one or more of the plurality of devices (e.g., plurality of devices 205A-N) of the computing system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device (s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a plurality of (e.g., series of) function nodes 235 arranged (e.g., by one or more directed edges) in a pipeline, graph architecture, etc.

Figure 2B:
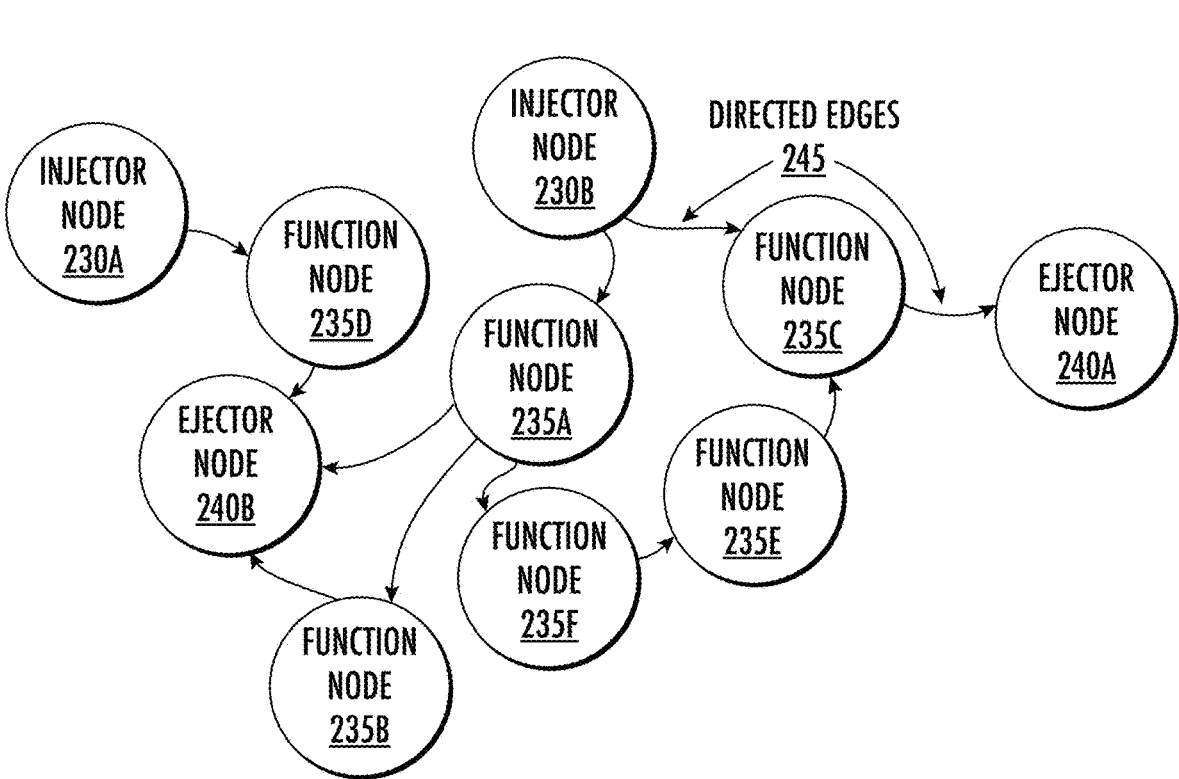
FIG. 2B depicts a diagram of an example functional graph according to example implementations of the present disclosure.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235 can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

Each function node of the plurality of function nodes 235A-F can be arranged in a directed graph architecture (e.g., including a plurality of function graphs) and can be configured to obtain function input data associated with an autonomous vehicle based on the one or more directed edges 245 (e.g., of the directed graph 225). For instance, the function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. The function nodes 235A-F can generate function output data based on the function input data. For instance, the function nodes 235A-F can perform one or more functions of the autonomous vehicle on the function input data to obtain the function output data. The function nodes 235A-F can communicate the function output data to one or more other function nodes of the plurality of function nodes 235A-F based on the one or more directed edges 245 of the directed graph 225.

In addition, or alternatively, each function graph 225 can include one or more injector nodes 230A-B and one or more ejector nodes 220A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example, each of the one or more injector nodes 230A-B can include a function configured to obtain and/or process sensor data from a respective sensor 280 shown in FIG. 2A (e.g., sensor(s) 135 of FIG. 1). The ejector nodes 240A-B can be configured to communicate with one or more devices 205B-N and/or processes 220C-220N outside the function graph 225 to provide function output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes. For instance, the messages communicated between nodes of a sub-graph dedicated to motion planning for an autonomous vehicle can help identify a basis path for the vehicle given the area/environment in which the vehicle is operating, motion constraints, costs, vehicle trajectories, etc.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N, etc. of the computing system 200 (e.g., the plurality of processes of the vehicle computing system 110, a plurality of processes of the one or more remote devices, etc.) can be communicatively connected over one or more wireless and/or wired networks 120. For instance, the plurality of devices 205A-N (and/or processes 220A-N of device 205A) can communicate over one or more communication channels. Each device and/or process can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. The messages, for example, can include function output data associated with a respective function node (e.g., 235).

Figure 3A:
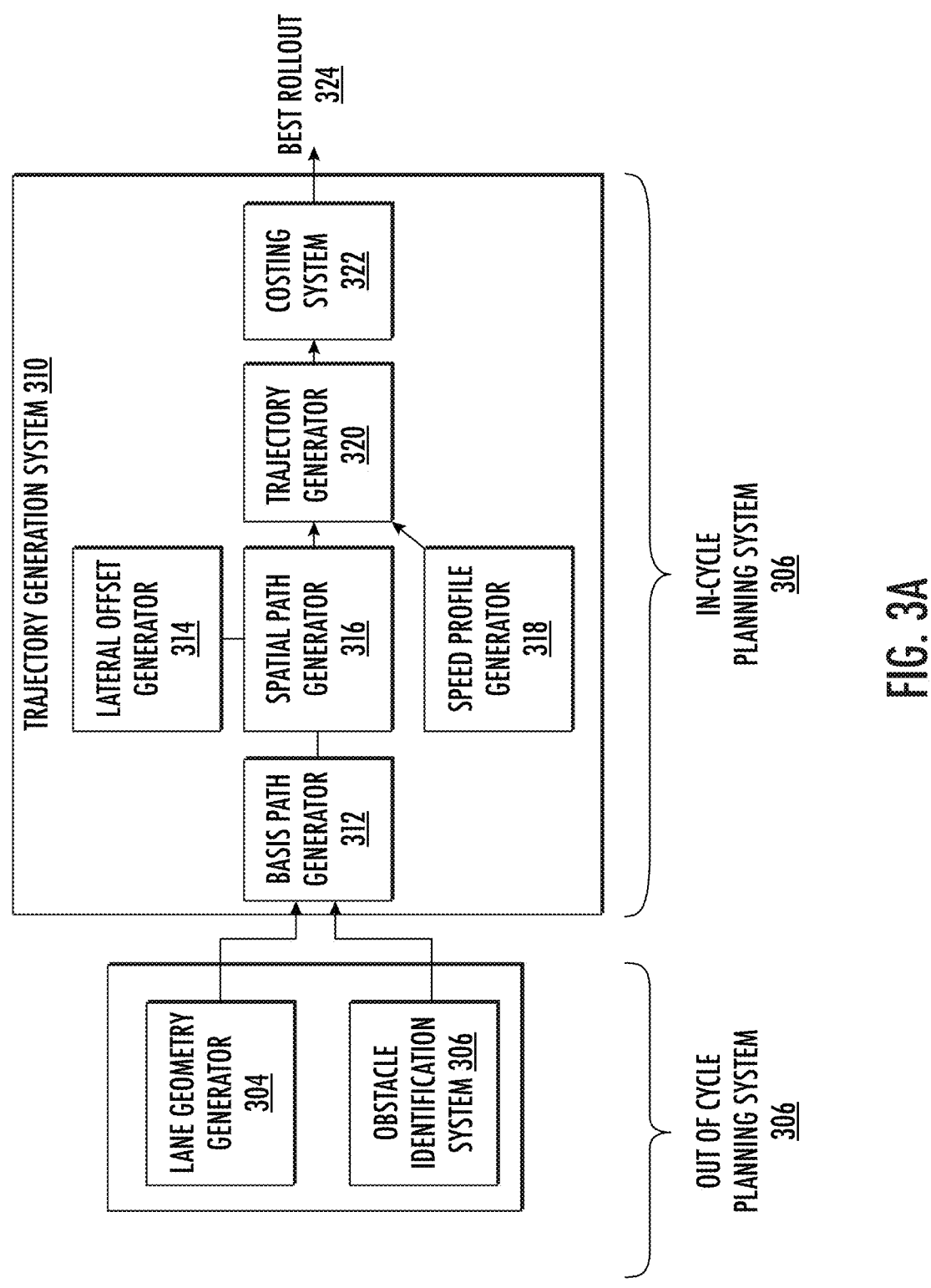
FIG. 3A depicts a block diagram of an example motion planning system according to example embodiments of the present disclosure.

FIG. 3A depicts a block diagram 300 of an example motion planning system according to example embodiments of the present disclosure. The vehicle computing system (e.g., vehicle computing system 110 in FIG. 1) of the autonomous vehicle can generate trajectories for the autonomous vehicle (e.g., autonomous vehicle 105 in FIG. 1) using a multi-step process. In some examples, some steps of the process can be performed out-of-cycle (e.g., not part of the real-time path generation cycle) 302 and some steps of the process are performed during the real-time path generation cycle.

The out-of-cycle planning system 302 can include a lane geometry generator 304 be configured to generate lane geometry for a plurality of potential lanes including, but not limited to lane boundaries for one or more lanes, determine a nominal path or centerline for each lane, and/or determine any other relevant factors for a particular area. In some examples, generating lane geometry may be accomplished or assisted by a geometry planner. For example, the lane geometer generator can determine the location of a nominal path through an area (e.g., following the centerline of a target lane) without specific knowledge of any transient obstacles that currently block the path.

In addition to a lane geometry generator 304, an obstacle identification system 306 can, as another out of cycle step, generate a list of static objects in the relevant geographic area, including, but not limited to, buildings, signs, mailboxes, other semi-permanent fixtures, etc. The lane geometry (including one or more nominal paths) and the list of obstacles generated by the out-of-cycle planning system 302 can be accessed by the vehicle computing system (e.g., vehicle computing system 110 in FIG. 1) for use by the trajectory generation system 310 while performing in-cycle path planning.

The vehicle computing system (e.g., vehicle computing system 110 in FIG. 1) can employ an in-cycle planning system 330 to generate specific trajectories based on the data produced by the out of cycle planning system 302. The in-cycle panning system 330 can include a trajectory generation system 310. The trajectory generation system 310 can include a basis path generator 312, a lateral offset generator 314, a spatial path generator 316, a speed profile generator 318, a trajectory generator 320, and a costing system 322.

The basis path generator 312 can generate one or more paths from the current position of the autonomous vehicle (e.g., autonomous vehicle 105 in FIG. 1) to a point on a target nominal path. Once the one or more basis paths are generated, they can be transmitted to a spatial path generator 316. The spatial path generator 316 can access a lateral offset generator 314 to generate a plurality of offset profiles. Each offset profile can be generated to include a plurality of offset values. An offset value can represent the distance and direction that the respective trajectory differs from the initial travel path at one or more times from the basis path. For example, a particular offset value may indicate that at a time 3 seconds into the basis path, the respective candidate trajectory places the autonomous vehicle 0.7 meters left of the basis path. In some implementations, the offset profile can be represented as a line on a graph wherein one axis on the graph represents the degree and direction of lateral variation from the initial travel path and the other axis represents time. Thus, each basis path can have a plurality of associated candidate trajectories that vary laterally from the original basis path based on the values in the lateral offset profile.

In addition, a speed profile generator 318 can generate a plurality of speed profiles (which describe target speeds for the autonomous vehicle (e.g., autonomous vehicle 105 in FIG. 1) at each point along a basis path). In some examples, a speed profile can be generated to include data indicating one or more acceleration values and, for each acceleration value, a time at which that acceleration value will be implemented. For instance, a speed profile can include a representation of a planned acceleration at one or more points in time. Based on this acceleration, a current velocity can be determined at any point in the acceleration. Additionally, or alternatively, the speed profile can include one or more velocities and a time at which the autonomous vehicle (e.g., autonomous vehicle 105 in FIG. 1) will reach those velocities. The speed profile can also include a vehicle jerk and/or an odometer position.

Additionally, or alternatively, the different types of speed profiles can be used and/or generated based on the specific characteristics of a given basis path. For example, a first type of speed profile can be associated with a situation in which emergency braking is necessary. The speed profiles of the first type of speed profile can be constructed using piece-wise constant jerk segments (e.g., the speed profiles can comprise a sequence of cubic polynomials).

A second type of speed profile can be associated with a situation in which a specific speed is a target (e.g., the autonomous vehicle is intending to achieve a particular speed and then coast at that speed). Speed profiles of the second type can be generated to use piece-wise constant snap calculations (e.g., the speed profiles can comprise a sequence of quartic polynomial functions).

A third type of speed profile can be associated with a situation in which the autonomous vehicle is targeting a speed for a particular distance (e.g., stop signs, traffic lights, gridlock, or the predicted movement of other actors within the environment). Speed profiles of the third type can be generated to use piece-wise constant crackle calculations (e.g., the speed profiles can comprise a sequence of quintic polynomial functions).

In some examples, the speed profiles can be generated based, at least in part, on map data including stopping locations such as stop signs, traffic lights, and/or traffic gridlock. The speed profiles can also be generated based on speed targets associated with a legal speed limit or a velocity target associated with one or more other factors (e.g., measured average traffic velocity for a particular area). In addition, the speed profiles can be generated based, at least in part, on the position and speed of actors in the location associated with the autonomous vehicles. In some examples, the vehicle computing system can predict the future movement of one or more actors for use during the generation of speed profiles. In this way, the autonomous vehicle (e.g., autonomous vehicle 105 in FIG. 1) can adaptively adjust its motion/behavior so that it can travel behind or in front of another action (e.g., with a safe buffer distance).

A trajectory generator 320 can generate a plurality of candidate trajectories based on different combinations of a basis path, an offset profile, and/or a speed profile. To generate a trajectory, an offset profile can be mapped onto a basis path and matched with a particular speed profile. Thus, each trajectory follows the general path of the basis path with one or more lateral adjustments and with the velocity and/or acceleration values designated by the speed profile. The vehicle computing system can generate a large number of candidate trajectories for the autonomous vehicle (e.g., autonomous vehicle 105 in FIG. 1). This allows many additional alternatives to quickly and efficiently be considered, while still maintaining a high degree of safety for the autonomous vehicle (e.g., autonomous vehicle 105 in FIG. 1). For example, if the basis path can be represented as a path through an environment, the offset profile for a particular trajectory can be represented as a path that follows the general route of the basis path but is offset laterally along the basis path as a function of distance. The degree to which the particular trajectory is laterally offset from the basis path can be represented as a function of time. Similarly, the speed profile can represent the expected velocity of the autonomous vehicle (e.g., autonomous vehicle 105 in FIG. 1) at each point in time when following the basis path. The trajectory generator 320 can generate a new trajectory by accessing a basis path, selecting an offset profile, and a speed profile. This information can be combined to result in a trajectory.

Once a plurality of candidate trajectories have been generated, each trajectory can be assigned a cost based on a plurality of cost determination functions by a costing system 322. The vehicle computing system (e.g., vehicle computing system 110 in FIG. 1) can select a candidate trajectory with the lowest total cost 324 and implement it as vehicle control commands to control the autonomous vehicle (e.g., autonomous vehicle 105 in FIG. 1).

FIG. 3B depicts a block diagram of an example basis path generation system 312 according to example embodiments of the present disclosure. The basis path can be generated by a basis path generation system 312. The basis path generation system 312 can include a state analysis system 332, a merge point selection system 334, a geometry modification system 336, and a candidate analysis system 338.

The state analysis system 332 can determine the current state of the autonomous vehicle (e.g., autonomous vehicle 105 in FIG. 1). For example, the state analysis system 332 can determine the current position (e.g., using an x, y coordinate, polar coordinates within a certain space), speed, heading, acceleration, turning radius, and/or other operating parameters of the autonomous vehicle (e.g., autonomous vehicle 105 in FIG. 1).

Based at least in part on the state of the autonomous vehicle (e.g., autonomous vehicle 105 in FIG. 1), the merge point selection system 334 can generate a plurality of candidate merge points at which the autonomous vehicle (e.g., autonomous vehicle 105 in FIG. 1) can join (or rejoin) the target nominal path. In some examples, the merge point selection system 334 can determine a lane change region associated with joining the target nominal path (e.g., in situations in which the autonomous vehicle (e.g., autonomous vehicle 105 in FIG. 1) is changing lanes). In some examples, lane change regions are predetermined features of the lane geometry that represent an area in which lane changes are possible. In other examples, a lane change region can be determined dynamically based on the position and speed of the autonomous vehicle (e.g., autonomous vehicle 105 in FIG. 1) as well as the geometry of the lanes. Thus, if the velocity of the autonomous vehicle (e.g., autonomous vehicle 105 in FIG. 1) is higher, the merge point selection system 334 can select a larger lane change region to give additional flexibility to the autonomous vehicle (e.g., autonomous vehicle 105 in FIG. 1).

In some examples, the merge points can be existing features of the lane geometry (e.g., coordinates that make up the nominal path). In this case, the merge point selection system 334 can identify all merge points that are within a selected lane change region (or proximate thereto). Additionally, or alternatively, the merge points can be generated by the merge point selection system 334 by identifying an initial point along the nominal path that is within the lane change region, and then identifying a plurality of candidate merge points by incrementally adding an interval distance along the nominal path until the end of the lane change region has been reached or a certain number of merge points have been generated.

The merge point selection system 334 can filter the plurality of candidate merge points to remove any that are unsuitable immediately. To do so, the merge point selection system 334 can order/prioritize the candidate merge points based on longitudinal distance along the nominal path. The merge point selection system 334 can use a classifier to immediately eliminate some merge points. The classifier can take, as input, the speed (v) of the autonomous vehicle (e.g., autonomous vehicle 105 in FIG. 1), the curvature (c) of the autonomous vehicle (e.g., autonomous vehicle 105 in FIG. 1), the lateral distance to the target nominal lath (d), and/or the heading distance between the autonomous vehicle's current heading and the target heading at the candidate merge point (dth). The merge point selection system 334 can fit a function regressor (F) such that $s=F(d, v, c, dth)$. If the candidate merge point's longitudinal distance along the nominal path is greater than s, the merge point can be retained. If not, the merge point selection system 334 can eliminate the merge point from consideration as being too curvy (e.g., unlikely to result in a drivable basis path).

Once the plurality of candidate merge points has been filtered, the merge point selection system 334 can generate a fit polynomial for a path to each remaining candidate merge point. Generating fit polynomials is relatively cheap in a computational sense and as such, the cost in doing so can be relatively small. A fit polynomial can be a polynomial that has been generated to intersect with a given set of points. Thus, if a path between a current position of an autonomous vehicle (e.g., autonomous vehicle 105 in FIG. 1) is represented by a number of points (e.g., coordinates that the autonomous vehicle (e.g., autonomous vehicle 105 in FIG. 1) travels between to follow the path), a fit polynomial can be generated such that follows that planned path and intersects each point in the path. Techniques for generating fit polynomials are well known to those in the art. The merge point selection system 334 can use a generated fit polynomial to determine whether the associated path between the autonomous vehicle (e.g., autonomous vehicle 105 in FIG. 1) and a given candidate merge point intersects with a lane boundary (e.g., identified in map data, sensor data) between the current lane and the target lane instead of passing through the determined lane change region. If the path does not pass through the determined lane change region, the merge point can be eliminated from consideration.

In some examples, each candidate merge point that intersects a lane boundary within a determined lane change region can be selected for use in generating a basis path. In this way, the basis path generation system 312 can generate a plurality of potential basis paths. In other examples, the merge point selection system 334 can identify one or a small fixed number of candidate merge points as being the most likely candidates. Note that if the basis path generation 312 does not include a lane change (e.g., the basis path corrects the autonomous vehicle (e.g., autonomous vehicle 105 in FIG. 1) back to the nominal path it was already following) then no merge points are generated. Instead, the merge point selection system 334 can select a point along the nominal path (s) where $s=s0+round\text{-}up(F(d, v, c, dth), 1.0)$ wherein S0 is a point along the current nominal path where the autonomous vehicle (e.g., autonomous vehicle 105 in FIG. 1) is projected to be.

Once one or more merge points have been selected, the geometry modification system 336 can determine whether the autonomous vehicle (e.g., autonomous vehicle 105 in FIG. 1) will be changing lanes. In some examples, the basis path generation system 312 has been instructed explicitly to change lanes by another component of the vehicle computing system (e.g., vehicle computing system 110 in FIG. 1) or a remote service system (e.g. to prepare for a turn or to avoid an obstacle). In other examples, the basis path generation system 312 can determine that a lane change is necessary based on an analysis of the current position of the autonomous vehicle (e.g., autonomous vehicle 105 in FIG. 1) and the location of the target nominal path.

In the case where the autonomous vehicle (e.g., autonomous vehicle 105 in FIG. 1) is not changing lanes, the geometry modification system 336 can alter stored lane boundary data (e.g., lane boundary offsets) to follow the new path back to the nominal path (e.g., the centerline of the lane). The geometry modification system 336 can determine a series of points along the proposed basis path from the autonomous vehicle (e.g., autonomous vehicle 105 in FIG. 1) to a point along the nominal path. For each point, the geometry modification system 336 can calculate new lane boundary offset value by extending a ray out perpendicularly from the point on the new path until it intersects an existing lane boundary. This distance can be set as the new lane boundary offset.

In the case in which the autonomous vehicle (e.g., autonomous vehicle 105 in FIG. 1) is changing lanes, the geometry modification system 336 can alter stored information about lane boundaries to remove the lane boundaries within the lane change region. New lane offsets can be determined along the one or more basis paths by inserting new lane offset values with a fixed distance (e.g., 2.5 meters) that follow along each generated basis path.

Once one or more basis paths have been generated by the basis path generation system 312, a candidate analysis system 338 can evaluate each candidate basis path to determine whether the candidate basis path meets one or more drivability criteria. Drivability criteria can include limits on speed (e.g., 40 m/s), acceleration (e.g., 1.4 m/s$^2$), jerk (e.g., 0.9 m/s$^3$), and so on. For example, a first basis path can be generated such that the merge point with the target nominal path occurs within 5 meters along the target nominal path from of the current position of the autonomous vehicle (e.g., autonomous vehicle 105 in FIG. 1), requiring the autonomous vehicle (e.g., autonomous vehicle 105 in FIG. 1) to turn sharply to follow the first basis path. The estimated acceleration to travel the first basis path can be calculated to be 2 m/s$^2$, which exceeds the acceleration limit value. As a result, the first basis path can be excluded for failing to meet at least one drivability criterion. In another example, a second basis path is generated such that the merge point with the target nominal path is 20 meters along the second basis path from the position of the autonomous vehicle (e.g., autonomous vehicle 105 in FIG. 1). The estimated speed, acceleration, and jerk can be calculated to fall within the predetermined limits. Thus, the second basis path can be determined to meet the one or more drivability criteria. The candidate analysis system 338 can select one or more basis paths that meet the drivability criteria.

Figure 4:
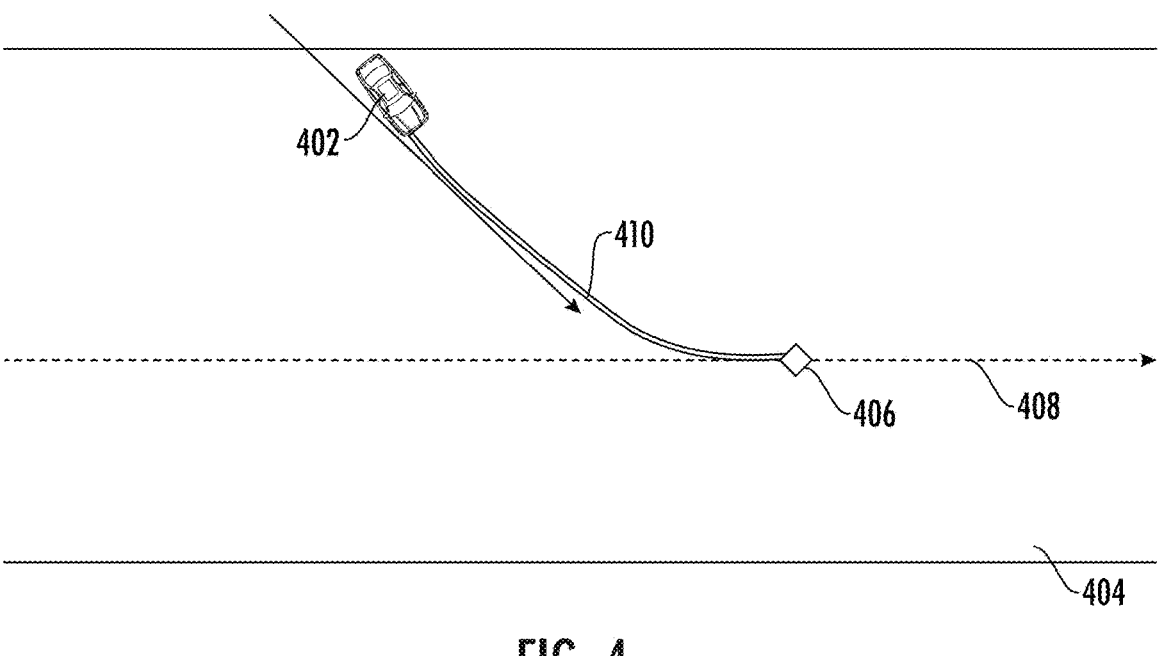
FIG. 4 depicts an example diagram illustrating an autonomous vehicle merging with a target path according to example embodiments of the present disclosure.

FIG. 4 depicts an example diagram illustrating an autonomous vehicle merging with a target path according to example embodiments of the present disclosure. In this example, an autonomous vehicle 402 can return to a centerline (e.g., a nominal path) of a lane 404 in which the autonomous vehicle 402 is already located. The autonomous vehicle 402 can identify a merge point 406 along the target nominal path 408, using the techniques described herein.

The vehicle computing system (e.g., vehicle computing system 110 in FIG. 1) can determine the current location and pose of the autonomous vehicle 402. The vehicle computing system (e.g., vehicle computing system 110 in FIG. 1) can generate one or more basis paths 410 from the current position of the autonomous vehicle (e.g., autonomous vehicle 105 in FIG. 1) and the merge point 406.

Figure 5:
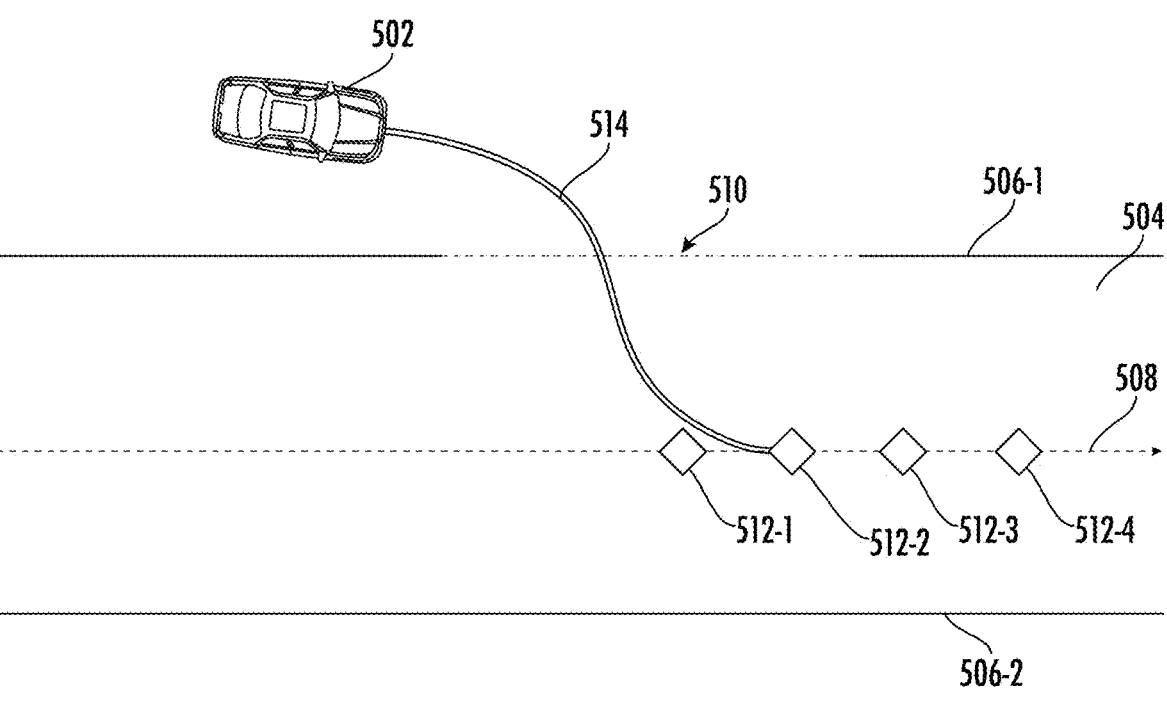
FIG. 5 depicts an example diagram illustrating the generation of a basis path for changing lanes according to example embodiments of the present disclosure.

FIG. 5 depicts an example diagram illustrating the generation of a basis path for changing lanes according to example embodiments of the present disclosure. In this example, the autonomous vehicle 502 starts outside the target lane 504. The target lane can be defined by two lane boundaries (e.g., 506-1 and 506-2) and have a nominal path 508 (e.g., a path that follows the centerline of the target lane 504).

The vehicle computing system (e.g., vehicle computing system 110 in FIG. 1) can identify a lane change region 510 that identifies a portion of a lane boundary (in this case lane boundary 506-1) through which the autonomous vehicle 502 can pass to change into the target lane 504 (e.g., to be located within the target lane 504). In some examples, the lane change region 510 can be selected based on the velocity and position of the autonomous vehicle 502 (e.g., such that the lane change region 510 allows enough space and time for the autonomous vehicle 502 to safely change lanes). Additionally, or alternatively, the lane change region 510 can be selected based on one or more legal lane designations (e.g., legal authority can designate some sections of a roadway as disallowing particular lane changes and some sections of a roadway as allowing particular lane changes. a section of a roadway as a non-passing zone).

Based on a determined lane change region 510, the vehicle computing system (e.g., vehicle computing system 110 in FIG. 1) can identify one or more merge points (e.g., 512-1, 512-2, 512-3, and 512-4). Note that the merge points do not need to be within the area of the lane associated with the lane change region 510. Merge points can be identified that are outside the lane change region 510 as long as the autonomous vehicle 502 will pass through the lane change region 510 when crossing the associated lane boundary 506-1.

One (or more) of the merge points (512-1 to 512-4) can be selected and a basis path 514 can be generated from the current location of the autonomous vehicle 502 to the selected merge point (M3 512-3) in this example. In some examples, the vehicle computing system (e.g., vehicle computing system 110 in FIG. 1) can generate potential basis paths for multiple merge points (e.g., 512-1 to 512-4) and evaluated for drivability. One or more of the potential basis paths can be selected and passed to the spatial path generator (e.g., spatial path generator 316 in FIG. 3A).

FIG. 6 depicts an example diagram illustrating the generation of merge points within a lane change region (608 and 618) according to example embodiments of the present disclosure. In this example, a first potential basis path 606 and a second potential basis path 616 can be evaluated based on their associated drivability. In this case, the autonomous vehicle 602 has an initial position and heading such that the first potential basis path 606 to a merge point 604 can be too curvy to meet one or more drivability criteria (e.g., too frequent changes in direction and/or an acceleration value that exceeds a predetermined limit).

For the second potential basis path 616, the autonomous vehicle 610 is in a similar position but has a different initial heading and thus second potential basis path 616 to the merge point 614 is significantly smoother than the first potential basis path 606 for autonomous vehicle 602. Thus, the initial position and heading of the autonomous vehicle 602 and 610 can have a significant result on which merge points can be ultimately selected.

Because the first potential basis path does not meet one or more drivability requirements, its associated merge point can be rejected. The second potential basis path does meet the one or more drivability requirements as thus its associated merge point can be accepted.

Figure 7:
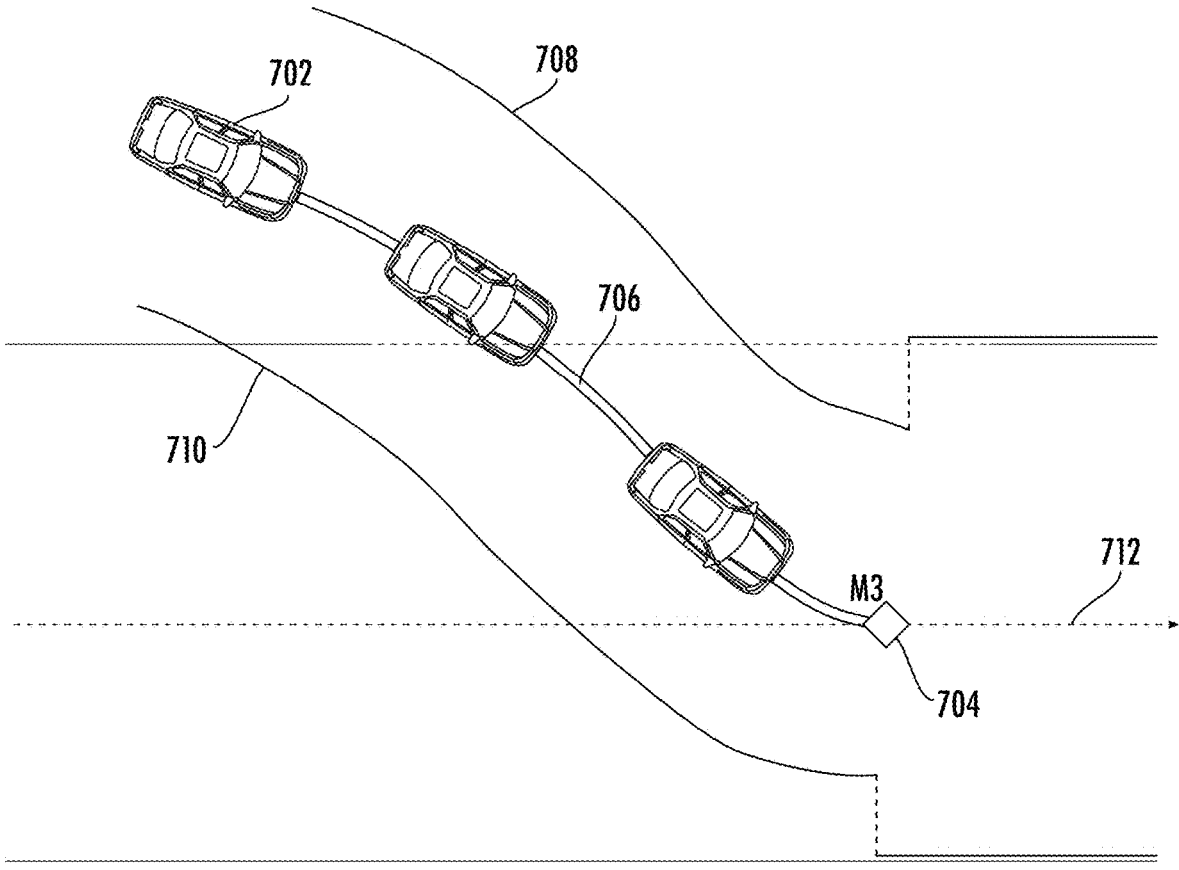
FIG. 7 depicts an example diagram illustrating the alteration of lane boundaries according to example embodiments of the present disclosure.

FIG. 7 depicts an example diagram illustrating the alteration of lane boundaries according to example embodiments of the present disclosure. In this example, the autonomous vehicle 702 can select a particular merge point 704 and generate a basis path 706 to that merge point 704. The vehicle computing system (e.g., vehicle computing system 110 in FIG. 1) can generate updated representations of lane boundaries along the path to the nominal path 712.

For example, the vehicle computing system (e.g., vehicle computing system 110 in FIG. 1) can determine the basis path 706 that the autonomous vehicle (e.g., autonomous vehicle 105 in FIG. 1) is following. The vehicle computing system (e.g., vehicle computing system 110 in FIG. 1) can determine an offset distance (e.g., 2 meters) and establish the updated representations of lane boundaries (708 and 710)

such that they follow the basis path 706 and are offset by the offset distance both to the left 708 and the right 710 of the basis path 706.

In this way, the trajectories that are generated do not receive a cost penalty based on the old lane boundary positions and do receive a cost penalty when crossing over the new lane boundary positions.

FIG. 8 depicts a flow chart diagram of an example method according to example embodiments of the present disclosure. One or more portions of method 800 can be implemented by one or more computing devices such as, for example, a computing device of an autonomous vehicle (e.g., autonomous vehicle 105) and/or a computing system offboard/remote from an autonomous vehicle (e.g., as depicted in FIG. 1). One or more portions of the method 700 described herein can be implemented as an algorithm on the hardware components of the devices described herein (e.g., as in FIGS. 1, 3A, 3B, 9, 10) to, for example, generate basis paths for an autonomous vehicle (e.g., autonomous vehicle 105 in FIG. 1). Although FIG. 8 depicts steps performed in a particular order for purposes of illustration and discussion, method 800 of FIG. 8 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

An autonomous vehicle (e.g., autonomous vehicle 105 in FIG. 1) can include a vehicle computing system (e.g., vehicle computing system 110 in FIG. 1). The vehicle computing system (e.g., vehicle computing system 110 in FIG. 1) can, at 802, obtain a target nominal path. In some examples, the target nominal path can be received from a remote server system associated with the autonomous vehicle (e.g., autonomous vehicle 105 in FIG. 1).

The vehicle computing system (e.g., vehicle computing system 110 in FIG. 1) can, at 804, determine a current pose for the autonomous vehicle (e.g., autonomous vehicle 105 in FIG. 1). The current pose for an autonomous vehicle (e.g., autonomous vehicle 105 in FIG. 1) can include a current location and a current heading. The current location of the autonomous vehicle (e.g., autonomous vehicle 105 in FIG. 1) can be associated with a first lane and the target nominal path can be associated with a second lane. For example, if the autonomous vehicle (e.g., autonomous vehicle 105 in FIG. 1) is changing lanes to make a turn, the current lane and the target lane can be two different lanes. In some examples, a lane boundary separates the first lane and the second lane.

The vehicle computing system (e.g., vehicle computing system 110 in FIG. 1) can, at 806, determine, based on the current pose of the autonomous vehicle and the target nominal path, a lane change region. In some examples, the vehicle computing system (e.g., vehicle computing system 110 in FIG. 1) can determine the lane change region by generating speed data associated with the autonomous vehicle (e.g., autonomous vehicle 105 in FIG. 1) and the target nominal path. The vehicle computing system (e.g., vehicle computing system 110 in FIG. 1) can determine a longitudinal plan based on the speed data. In some examples, the lane change region can be determined based at least in part on the longitudinal plan.

The vehicle computing system (e.g., vehicle computing system 110 in FIG. 1) can, at 808 determine one or more merge points on the target nominal path. The vehicle computing system (e.g., vehicle computing system 110 in FIG. 1) can identify an initial point along the target nominal path within the lane change region. The vehicle computing system (e.g., vehicle computing system 110 in FIG. 1) can identify a first merge point at a predetermined distance along the target nominal path from the initial point.

The vehicle computing system (e.g., vehicle computing system 110 in FIG. 1) can identify additional merge points by starting at the first merge point and identifying additional merge points along the target nominal path. In some examples, the distance interval between the one or more merge points remains constant. The vehicle computing system (e.g., vehicle computing system 110 in FIG. 1) can filter the one or more merge points to remove any merge points that fall outside a predetermined threshold distance from the lane change region. The predetermined threshold distance can be a fixed distance such as 10 meters. Additionally, or alternatively, the predetermined threshold distance can be based on the current velocity of the autonomous vehicle (e.g., autonomous vehicle 105 in FIG. 1). Thus, for example, the predetermine threshold distance can be set at ten times the current velocity of the autonomous vehicle (e.g., autonomous vehicle 105 in FIG. 1) in m/s. So if an autonomous vehicle (e.g., autonomous vehicle 105 in FIG. 1) has a velocity of 1 m/s, the predetermined threshold distance can be 10 meters. If the current velocity is 5 m/s, the predetermined threshold distance can be 50 meters.

The vehicle computing system (e.g., vehicle computing system 110 in FIG. 1) can, at 810, for each respective merge point in the one or more merge points, generate a candidate basis path from the current pose of the autonomous vehicle (e.g., autonomous vehicle 105 in FIG. 1) to the respective merge point. The vehicle computing system (e.g., vehicle computing system 110 in FIG. 1) can, at 812, generate a suitability classification for each candidate basis path.

The vehicle computing system (e.g., vehicle computing system 110 in FIG. 1) can, for each candidate basis path, determine whether an acceleration rate associated with the candidate basis path exceeds a predetermined acceleration threshold. The suitability classification is based, at least in part on whether the acceleration rate exceeds a predetermined acceleration threshold. For each candidate basis path, the vehicle computing system (e.g., vehicle computing system 110 in FIG. 1) can determine whether a curvature associated with the candidate basis path exceeds a predetermined curvature threshold. The suitability classification can be based, at least in part on whether the maximum curvature exceeds a predetermined curvature threshold.

The vehicle computing system (e.g., vehicle computing system 110 in FIG. 1) can select, at 814, one or more candidate basis paths based at least in part on the suitability classification for each respective candidate basis path in the one or more candidate basis paths. The vehicle computing system (e.g., vehicle computing system 110 in FIG. 1) can generate a plurality of candidate trajectories for the autonomous vehicle (e.g., autonomous vehicle 105 in FIG. 1) based on the selected candidate basis paths.

The vehicle computing system (e.g., vehicle computing system 110 in FIG. 1) can determine a cost associated with each candidate trajectory in the plurality of candidate trajectories for the autonomous vehicle. The vehicle computing system (e.g., vehicle computing system 110 in FIG. 1) can select a candidate trajectory based on the costs associated with the plurality of candidate trajectories for the autonomous vehicle (e.g., autonomous vehicle 105 in FIG. 1). The vehicle computing system (e.g., vehicle computing system 110 in FIG. 1) can convert the selected candidate trajectory into one or more vehicle controls for implementation by the autonomous vehicle (e.g., autonomous vehicle 105 in FIG. 1).

Figure 9:
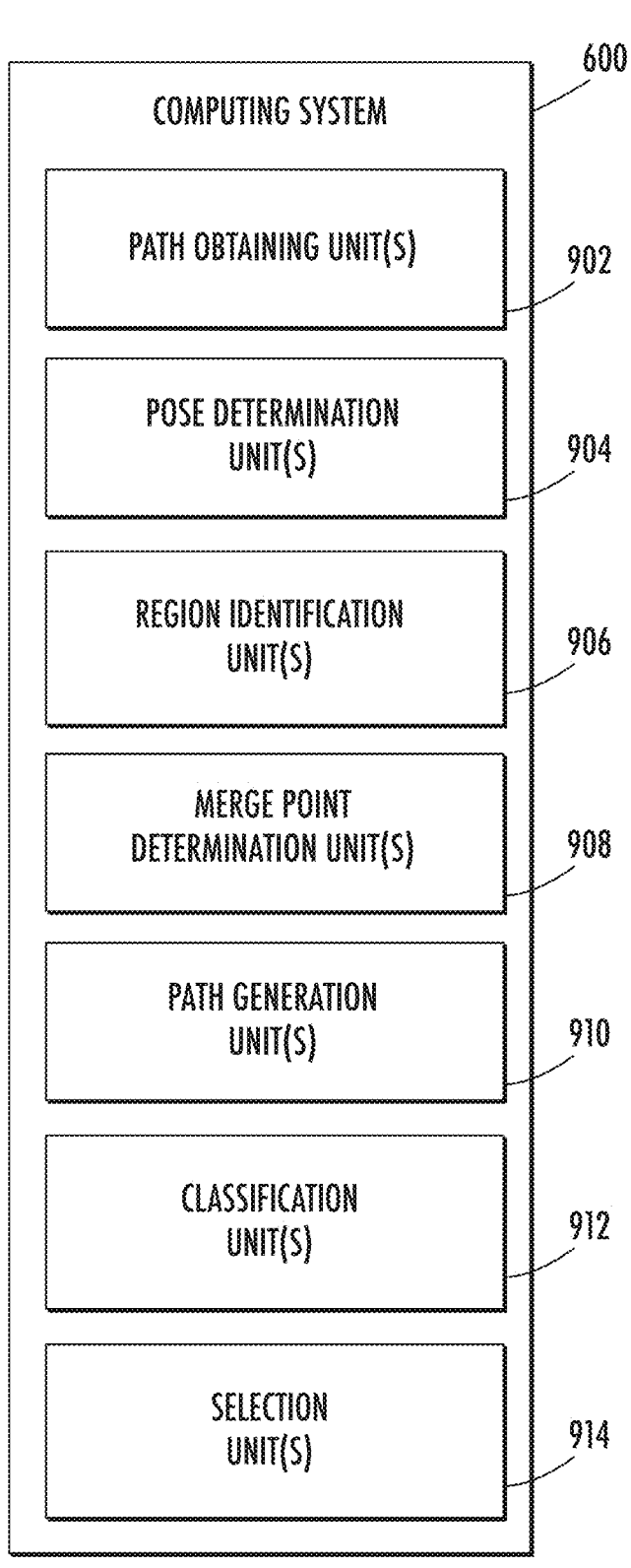
FIG. 9 depicts an example system with units for performing operations and functions according to example aspects of the present disclosure.

FIG. 9 depicts an example system 900 with units for performing operations and functions according to example aspects of the present disclosure. Various means can be configured to perform the methods and processes described herein. For example, a computing system can include path obtaining units(s), pose determination units(s), region identification units(s), merge point determination units(s), path generation units(s), classification units(s), selection units(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain a target nominal path. For example, a vehicle computing system (e.g., vehicle computing system 110 in FIG. 1) can access target nominal path data from a map database stored in an accessible computing system. A path obtaining unit 902 is one example of a means for obtaining a target nominal path.

The means can be configured to determine a current pose for the autonomous vehicle. For example, the vehicle computing system (e.g., vehicle computing system 110 in FIG. 1) can determine the location, speed, and heading of the autonomous vehicle (e.g., autonomous vehicle 105 in FIG. 1). A pose determination unit 904 is one example of a means for determining a current pose for the autonomous vehicle.

The means can be configured to determine, based on the current pose of the autonomous vehicle and the target nominal path, a lane change region. For example, the vehicle computing system (e.g., vehicle computing system 110 in FIG. 1) can determine a specific distance along a lane at which a lane change region begins and ends based on the characteristics of the lane and the speed and pose of the autonomous vehicle (e.g., autonomous vehicle 105 in FIG. 1). A region identification unit 906 is one example of a means for determining, based on the current pose of the autonomous vehicle and the target nominal path, a lane change region.

The means can be configured to determine one or more merge points on the target nominal path. For example, the vehicle computing system (e.g., vehicle computing system 110 in FIG. 1) can identify a series of coordinates that make up the nominal path. The vehicle computing system (e.g., vehicle computing system 110 in FIG. 1) can identify each coordinate from the nominal path that falls within the lane change region as potential merge points. The potential merge points can be filtered to remove any unsuitable merge points. A merge point determination unit 908 is one example of a means for determining one or more merge points on the target nominal path.

The means can be configured to, for each respective merge point in the one or more merge points, generate a candidate basis path from the current pose of the autonomous vehicle to the respective merge point. For example, the vehicle computing system (e.g., vehicle computing system 110 in FIG. 1) can plan a path from the autonomous vehicle (e.g., autonomous vehicle 105 in FIG. 1) to each candidate merge point. A path generation unit 910 is one example of a means for, for each respective merge point in the one or more merge points, generating a candidate basis path from the current pose of the autonomous vehicle (e.g., autonomous vehicle 105 in FIG. 1) to the respective merge point.

The means can be configured to generate a suitability classification for each candidate basis path. For example, the vehicle computing system (e.g., vehicle computing system 110 in FIG. 1) can evaluate a maximum acceleration rate, speed, and/or turning rate for the candidate basis path. A classification unit 912 is one example of a means for generating a suitability classification for each candidate basis path.

The means can be configured to select a candidate basis path based on the suitability classification for each respective candidate basis path in the one or more candidate basis paths. For example, the vehicle computing system (e.g., vehicle computing system 110 in FIG. 1) can choose the basis path that is the most suitable for reaching a point on the target nominal path. A selection unit 914 is one example of a means for selecting a candidate basis path based on the suitability classification for each respective candidate basis path in the one or more candidate basis paths.

Figure 10:
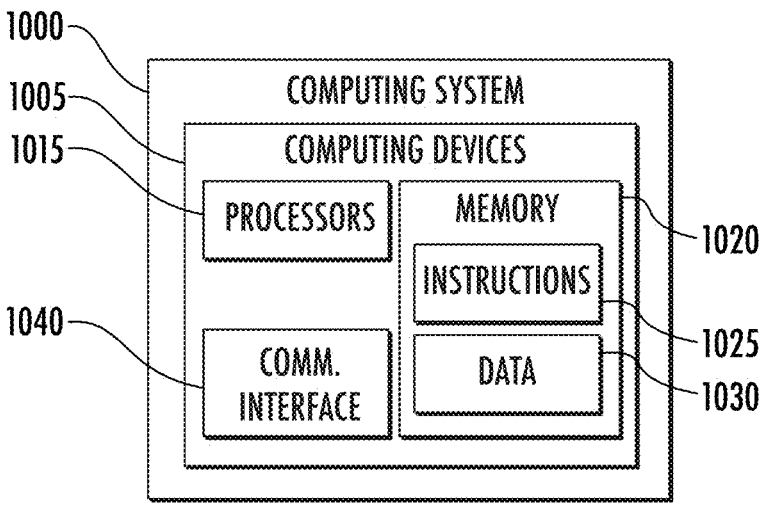
FIG. 10 depicts example system components according to example aspects of the present disclosure.

FIG. 10 depicts example system components according to example aspects of the present disclosure. The example system 1000 illustrated in FIG. 10 is provided as an example only. The components, systems, connections, and/or other aspects illustrated in FIG. 10 are optional and are provided as examples of what is possible, but not required, to implement the present disclosure. The computing system 1000 can be and/or include the vehicle computing system 110 of FIG. 1. The computing system 1000 can be associated with an operations system and/or an entity associated with the vehicle 105 such as, for example, a vehicle owner, vehicle manager, fleet operator, service provider, etc.

The computing device(s) 1005 of the computing system 1000 can include processor(s) 1015 and at least one memory 1020. The one or more processors 1015 can be any suitable processing device (e.g., a processor core, a microprocessor, an ASIC, an FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, magnetic disks, data registers, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 on-board the vehicle 105 can store instructions 1025 that when executed by the one or more processors 1015 cause the one or more processors 1015 (e.g., in the vehicle computing system 110) to perform operations such as any of the operations and functions of the computing device(s) 1005 and/or vehicle computing system 110 (and its sub-systems (e.g., the motion planner system 170C, etc.)), any of the operations and functions for which the vehicle computing system 110 (and/or its subsystems) are configured, any portions of the methods described herein, and/or any other operations and functions described herein. Memory for a system offboard a vehicle can store instructions to perform any operations and functions of the offboard systems described herein and/or the operations and functions of the autonomous vehicle (its computing system), methods, and/or any other operations and functions described herein.

The memory 1020 can store data 1030 that can be obtained (e.g., received, accessed, written, manipulated, created, generated, etc.) and/or stored. The data 1030 can include, for instance, services data (e.g., trip data, route data, user data, etc.), sensor data, map data, perception data, prediction data, motion planning data, merge point data, acceleration data, threshold drivability data, basis path data, nominal path data, speed profile data, offset profile data, drivability criteria data, and/or other data/information as described herein. In some implementations, the computing device(s) 1005 can obtain data from one or more memories that are remote from the autonomous vehicle 105.

The computing device(s) 1005 can also include a communication interface 1040 used to communicate with one or more other system(s) (e.g., the remote computing system). The communication interface 1040 can include any circuits, components, software, etc. for communicating via one or more networks (e.g., network(s)). In some implementations, the communication interface 1040 can include, for example, one or more of: a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for controlling an autonomous vehicle, comprising:
   (a) receiving lane geometry data for a surrounding environment of the autonomous vehicle, wherein receiving the lane geometry data is performed out-of-cycle;
   (b) obtaining object data indicative of objects in the surrounding environment of the autonomous vehicle, wherein obtaining the object data is performed out-of-cycle;
   (c) generating a basis path for the autonomous vehicle based on the lane geometry data and the object data, wherein generating the basis path comprises determining that the basis path meets one or more drivability criteria, wherein the basis path is generated in-cycle;
   (d) generating a plurality of candidate trajectories based on the basis path, the plurality of candidate trajectories respectively comprising a combination of the basis path with a lateral offset profile of a plurality of lateral offset profiles such that the plurality of candidate trajectories are shifted laterally along the basis path;
   (e) selecting a selected candidate trajectory of the plurality of candidate trajectories, and
   (f) controlling the autonomous vehicle based on the selected candidate trajectory.

2. The computer-implemented method of claim 1, wherein the lateral offset profile comprises a distance and a direction by which the basis path and a respective offset value differ at a point along the basis path.

3. The computer-implemented method of claim 1, further comprising generating a plurality of speed profiles describing target speeds for the autonomous vehicle along the basis path,
   wherein generating the plurality of candidate trajectories is based on the plurality of speed profiles.

4. The computer-implemented method of claim 3, wherein the plurality of speed profiles comprise one or both of: a representation of planned acceleration at one or more points in time; or one or more velocities and respective times at which the autonomous vehicle will reach those velocities.

5. The computer-implemented method of claim 1, wherein the basis path is generated by a basis path generation system comprising a vehicle state analysis system, a merge point selection system, a geometry modification system, and a candidate analysis system.

6. The computer-implemented method of claim 1, wherein the lane geometry data comprises one or more of lane boundaries for one or more lanes or a nominal path or centerline for the one or more lanes.

7. The computer-implemented method of claim 6, wherein the basis path comprises a path from a current position of the autonomous vehicle to a point on the nominal path of one of the one or more lanes.

8. The computer-implemented method of claim 1, wherein the object data comprises a list of static objects, the list of static objects comprising one or more of buildings, signs, mailboxes, or semi-permanent fixtures.

9. The computer-implemented method of claim 1, wherein the one or more drivability criteria comprise one or more of: limits on speed; limits on acceleration; limits on jerk; or limits on turning radius.

10. The computer-implemented method of claim 1, wherein generating the basis path comprises evaluating a plurality of candidate basis paths to determine whether the plurality of candidate basis paths meet the one or more drivability criteria.

11. The computer-implemented method of claim 1, wherein selecting a selected candidate trajectory comprises:

(i) assigning respective costs to the plurality of candidate trajectories based on one or more cost determination functions; and (ii) selecting the selected candidate trajectory based on the respective costs of the plurality of candidate trajectories.

12. The computer-implemented method of claim 11, wherein (ii) comprises selecting the selected candidate trajectory having a lowest total cost of the respective costs.

13. The computer-implemented method of claim 11, wherein the one or more cost determination functions comprise objective functions based on speed limits, traffic lights, traffic laws, or predicted motion trajectories of one or more objects in the surrounding environment of the autonomous vehicle.

14. The computer-implemented method of claim 1, wherein each lateral offset profile of the plurality of lateral offset profiles is representative of a different distance to shift the basis path laterally.

15. An autonomous vehicle (AV) control system, comprising:

a trajectory generation system, comprising:
    a lane geometry generator;
    an obstacle identification system;
    a basis path generator; and
    a trajectory generator;
one or more processors; and
one or more non-transitory, computer-readable media storing instructions that, when implemented, cause the one or more processors to perform operations, the operations comprising:
    (a) receiving lane geometry data for a surrounding environment of the autonomous vehicle from the lane geometry generator;
    (b) obtaining object data indicative of objects in the surrounding environment of the autonomous vehicle from the obstacle identification system;
    (c) generating a basis path for the autonomous vehicle based on the lane geometry data and the object data by the basis path generator, wherein generating the basis path comprises determining that the basis path meets one or more drivability criteria;
    (d) generating a plurality of candidate trajectories based on the basis path by the trajectory generator, the plurality of candidate trajectories respectively comprising a combination of the basis path with a lateral offset profile of a plurality of lateral offset profiles such that the plurality of candidate trajectories are shifted laterally along the basis path, wherein each lateral offset profile of the plurality of lateral offset profiles is representative of a different distance to shift the basis path laterally;

(e) selecting a selected candidate trajectory of the plurality of candidate trajectories; and (f) controlling the autonomous vehicle based on the selected candidate trajectory.

16. The AV control system of claim 15, wherein the operations further comprise generating a plurality of speed profiles describing target speeds for the autonomous vehicle along the basis path, wherein generating the plurality of candidate trajectories is based on the plurality of speed profiles.

17. The AV control system of claim 15, wherein the lane geometry generator and object identification system perform out-of-cycle and the basis path generator and trajectory generator perform in-cycle.

18. An autonomous vehicle, comprising:

a trajectory generation system, comprising:
    a lane geometry generator;
    an obstacle identification system;
    a basis path generator; and
    a trajectory generator;
one or more processors; and
one or more non-transitory, computer-readable media storing instructions that, when implemented, cause the one or more processors to perform operations, the operations comprising:
    (a) receiving lane geometry data for a surrounding environment of the autonomous vehicle from the lane geometry generator, wherein receiving the lane geometry data is performed out-of-cycle;
    (b) obtaining object data indicative of objects in the surrounding environment of the autonomous vehicle from the obstacle identification system, wherein obtaining the object data is performed out-of-cycle;
    (c) generating a basis path for the autonomous vehicle based on the lane geometry data and the object data by the basis path generator, wherein generating the basis path comprises determining that the basis path meets one or more drivability criteria, wherein the basis path is generated in-cycle;
    (d) generating a plurality of candidate trajectories based on the basis path by the trajectory generator, the plurality of candidate trajectories respectively comprising a combination of the basis path with a lateral offset profile such that the plurality of candidate trajectories are shifted laterally along the basis path;
    (e) selecting a selected candidate trajectory of the plurality of candidate trajectories; and
    (f) controlling the autonomous vehicle based on the selected candidate trajectory.

19. The autonomous vehicle of claim 18, wherein the lateral offset profile is representative of a distance to shift the basis path laterally.

* * * * *